United States Patent
Wijnands et al.

(10) Patent No.: US 11,451,474 B2
(45) Date of Patent: Sep. 20, 2022

(54) EQUAL COST MULTI-PATH WITH BIT INDEXED EXPLICIT REPLICATION

(71) Applicant: Cisco Technology, Inc., San Jose, CA (US)

(72) Inventors: Ijsbrand Wijnands, Leuven (BE); Gregory J. Shepherd, Eugene, OR (US); Christian J. Martin, Rumson, NJ (US); Rajiv Asati, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 251 days.

(21) Appl. No.: 14/603,501

(22) Filed: Jan. 23, 2015

(65) Prior Publication Data

US 2015/0131658 A1 May 14, 2015

Related U.S. Application Data

(63) Continuation-in-part of application No. 14/488,790, filed on Sep. 17, 2014, now Pat. No. 10,225,090, and
(Continued)

(51) Int. Cl.
*H04L 45/7453* (2022.01)
*H04L 45/00* (2022.01)
(Continued)

(52) U.S. Cl.
CPC ........ *H04L 45/7453* (2013.01); *H04L 12/185* (2013.01); *H04L 45/16* (2013.01);
(Continued)

(58) Field of Classification Search
CPC ....... H04L 12/185; H04L 45/16; H04L 45/24; H04L 45/38; H04L 45/50; H04L 45/74; H04L 45/7453
See application file for complete search history.

(56) References Cited

U.S. PATENT DOCUMENTS

| | | | |
|---|---|---|---|
| 5,088,091 A * | 2/1992 | Schroeder | ............... H04L 12/28 370/406 |
| 5,138,615 A | 8/1992 | Lamport | ....................... 370/400 |

(Continued)

FOREIGN PATENT DOCUMENTS

| | | |
|---|---|---|
| CN | 1754 353 | 3/2006 |
| CN | 1792 065 | 6/2006 |

(Continued)

OTHER PUBLICATIONS

Das, K; IPv6 Header Deconstructed; Apr. 18, 2008; http://www.ipv6.com/articles/general/IPv6-Header.htm.*
(Continued)

*Primary Examiner* — Alex Skripnikov

(57) ABSTRACT

Various systems and methods for performing bit indexed explicit replication (BIER). For example, one method involves receiving a packet at a node. The packet includes a bit string. The node selects forwarding information based on a flow value associated with the packet. The forwarding information includes a forwarding bit mask. The node then forwards the packet based on the bit string and the forwarding information.

20 Claims, 19 Drawing Sheets

Related U.S. Application Data a continuation-in-part of application No. 14/488,761, filed on Sep. 17, 2014, now Pat. No. 9,853,822, and a continuation-in-part of application No. 14/488,810, filed on Sep. 17, 2014, now Pat. No. 9,942,053.

(60) Provisional application No. 61/878,693, filed on Sep. 17, 2013, provisional application No. 61/931,473, filed on Jan. 24, 2014.

(51) Int. Cl.
  *H04L 45/24* (2022.01)
  *H04L 12/18* (2006.01)
  *H04L 45/16* (2022.01)

(52) U.S. Cl.
  CPC .............. *H04L 45/24* (2013.01); *H04L 45/38* (2013.01); *H04L 45/54* (2013.01)

(56) References Cited

U.S. PATENT DOCUMENTS

| | | | |
|---|---|---|---|
| 5,764,624 A | 6/1998 | Endo | 370/218 |
| 5,999,531 A | 12/1999 | Ferolito | 370/390 |
| 6,130,881 A | 10/2000 | Stiller | 370/238 |
| 6,147,976 A | 11/2000 | Shand | 370/254 |
| 6,148,000 A | 11/2000 | Feldman | 307/394 |
| 6,240,188 B1 | 5/2001 | Dondeti | 380/259 |
| 6,615,336 B1 | 9/2003 | Chen | 370/351 |
| 6,771,673 B1 | 8/2004 | Baum | 370/535 |
| 6,778,532 B1 | 8/2004 | Akahane | 370/389 |
| 6,873,627 B1 | 3/2005 | Miller | |
| 7,111,101 B1 | 9/2006 | Bourke | 326/40 |
| 7,281,085 B1* | 10/2007 | Garg | G11C 15/00 |
| | | | 370/235 |
| 7,519,733 B1 | 4/2009 | Thubert | 709/232 |
| 7,551,599 B2 | 6/2009 | Levit | 370/254 |
| 7,925,778 B1 | 4/2011 | Wijnands | 370/389 |
| 8,320,374 B2 | 11/2012 | de Heer | 370/390 |
| 8,325,726 B2 | 12/2012 | Baban et al. | 370/390 |
| 8,670,146 B1 | 3/2014 | Van Couvering | 358/1.15 |
| 8,774,179 B1 | 7/2014 | Gaggara | 370/389 |
| 8,787,400 B1* | 7/2014 | Barth | H04L 45/24 |
| | | | 370/419 |
| 8,830,826 B2 | 9/2014 | Chen | 370/228 |
| 8,848,728 B1 | 9/2014 | Revah | 370/389 |
| 8,880,869 B1 | 11/2014 | Shah | 713/151 |
| 8,890,903 B2 | 11/2014 | Russell | 345/690 |
| 8,942,256 B1 | 1/2015 | Barth | 370/255 |
| 9,455,918 B1 | 9/2016 | Revah | |
| 2002/0126661 A1 | 9/2002 | Ngai | 370/380 |
| 2002/0191628 A1 | 12/2002 | Liu | 370/428 |
| 2003/0043802 A1* | 3/2003 | Yazaki | H04L 29/06 |
| | | | 370/389 |
| 2003/0048779 A1 | 3/2003 | Doherty | 370/389 |
| 2003/0088696 A1* | 5/2003 | McCanne | H04L 12/1836 |
| | | | 709/238 |
| 2003/0142685 A1 | 7/2003 | Bare | 370/410 |
| 2003/0210695 A1* | 11/2003 | Henrion | H04L 45/00 |
| | | | 370/392 |
| 2004/0190526 A1 | 9/2004 | Kumar | |
| 2004/0190527 A1 | 9/2004 | Okura | 370/395.21 |
| 2004/0240442 A1 | 12/2004 | Grimminger | 370/389 |
| 2004/0264374 A1* | 12/2004 | Yu | H04L 45/00 |
| | | | 370/230 |
| 2005/0018693 A1* | 1/2005 | Dull | H04L 12/4641 |
| | | | 370/396 |
| 2005/0157724 A1 | 7/2005 | Montuno | 370/392 |
| 2005/0169270 A1 | 8/2005 | Mutou | 370/390 |
| 2005/0181807 A1 | 8/2005 | Dowling | 455/456.1 |
| 2005/0232272 A1 | 10/2005 | Deng | 370/390 |
| 2006/0133298 A1 | 6/2006 | Ng | 370/254 |
| 2006/0182035 A1 | 8/2006 | Vasseur | 370/238 |
| 2006/0187817 A1 | 8/2006 | Charzinski | 370/216 |
| 2006/0280192 A1 | 12/2006 | Desanti | 370/409 |
| 2006/0291444 A1 | 12/2006 | Alvarez | 370/351 |
| 2007/0115968 A1 | 5/2007 | Brown | |
| 2007/0127474 A1 | 6/2007 | Mirtorabi et al. | 370/390 |
| 2007/0189291 A1 | 8/2007 | Tian | 370/390 |
| 2008/0069125 A1 | 3/2008 | Reed | 370/410 |
| 2008/0159285 A1 | 7/2008 | De Heer | 370/390 |
| 2008/0165783 A1 | 7/2008 | Desanti | 370/392 |
| 2008/0194240 A1 | 8/2008 | Dowling | 455/414.3 |
| 2008/0212465 A1 | 9/2008 | Yan | 370/225 |
| 2008/0240105 A1 | 10/2008 | Abdallah | 370/392 |
| 2008/0316916 A1 | 12/2008 | Tazzari | 370/216 |
| 2009/0067348 A1 | 3/2009 | Vasseur | 370/256 |
| 2009/0185549 A1 | 7/2009 | Shon | 370/349 |
| 2009/0196289 A1 | 8/2009 | Shankar | 370/390 |
| 2009/0213735 A1 | 8/2009 | Check | 370/236 |
| 2009/0219817 A1 | 9/2009 | Carley | 370/235.1 |
| 2009/0225650 A1 | 9/2009 | Vasseur | 370/218 |
| 2009/0310610 A1 | 12/2009 | Sandstrom | 370/394 |
| 2010/0046400 A1 | 2/2010 | Wu | |
| 2010/0046515 A1 | 2/2010 | Wong | 370/390 |
| 2010/0124225 A1 | 5/2010 | Fedyk | |
| 2010/0191911 A1 | 7/2010 | Heddes | 711/118 |
| 2011/0149973 A1 | 6/2011 | Esteve Rothenberg | 370/392 |
| 2011/0228770 A1 | 9/2011 | Dholakia | 370/390 |
| 2011/0238816 A1 | 9/2011 | Vohra | |
| 2011/0274112 A1 | 11/2011 | Czaszar | 370/392 |
| 2011/0299531 A1 | 12/2011 | Yu | 370/392 |
| 2012/0075988 A1 | 3/2012 | Lu | 370/218 |
| 2012/0099591 A1 | 4/2012 | Kotha | 370/392 |
| 2012/0106560 A1 | 5/2012 | Gumaste | 370/401 |
| 2012/0198064 A1 | 8/2012 | Boutros | |
| 2012/0236857 A1 | 9/2012 | Manzella | 370/390 |
| 2012/0243539 A1 | 9/2012 | Keesara | 370/392 |
| 2013/0034097 A1* | 2/2013 | Dharmapurikar | H04L 45/026 |
| | | | 370/390 |
| 2013/0051376 A1 | 2/2013 | Hatashita | 370/338 |
| 2013/0107725 A1 | 5/2013 | Jeng | |
| 2013/0114595 A1* | 5/2013 | Mack-Crane | H04L 12/185 |
| | | | 370/390 |
| 2013/0114619 A1 | 5/2013 | Wakumoto | 370/406 |
| 2013/0136123 A1 | 5/2013 | Ge | 370/390 |
| 2013/3136117 | 5/2013 | Schrum, Jr. | 370/338 |
| 2013/0170450 A1 | 7/2013 | Anchan | 370/329 |
| 2013/0195001 A1 | 8/2013 | Liu | 370/312 |
| 2013/0201988 A1 | 8/2013 | Zhou | 370/390 |
| 2013/0308948 A1 | 11/2013 | Swinkels | 398/66 |
| 2013/0329728 A1 | 12/2013 | Ramesh | 370/390 |
| 2013/0336315 A1 | 12/2013 | Guichard | 370/389 |
| 2013/0343384 A1 | 12/2013 | Shepherd | 370/390 |
| 2014/0010074 A1 | 1/2014 | Ye | |
| 2014/0010223 A1 | 1/2014 | Wang | 370/338 |
| 2014/0043964 A1* | 2/2014 | Gabriel | H04L 41/5022 |
| | | | 370/229 |
| 2014/0064081 A1 | 3/2014 | Morandin | |
| 2014/0098813 A1* | 4/2014 | Mishra | H04L 12/185 |
| | | | 370/390 |
| 2014/0119191 A1 | 5/2014 | Onoue | 370/236 |
| 2014/0126575 A1 | 5/2014 | Janneteau | |
| 2014/0160925 A1 | 6/2014 | Xu | 370/235 |
| 2014/0189174 A1 | 7/2014 | Ajanovic | 710/106 |
| 2014/0362846 A1 | 12/2014 | Li | 370/338 |
| 2014/0369356 A1 | 12/2014 | Bryant | |
| 2015/0003458 A1 | 1/2015 | Li | 370/392 |
| 2015/0009823 A1 | 1/2015 | Ganga | 370/235 |
| 2015/0016469 A1 | 1/2015 | Ganichev | 370/429 |
| 2015/0023328 A1 | 1/2015 | Thubert et al. | 370/336 |
| 2015/0049760 A1 | 2/2015 | Xu | 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0081941 A1 | 3/2015 | Brown | 710/116 |
| 2015/0085635 A1 | 3/2015 | Wijnands et al. | 370/216 |
| 2015/0092546 A1 | 4/2015 | Baratam | 370/230 |
| 2015/0131659 A1 | 5/2015 | Wijnands et al. | 370/390 |
| 2015/0131660 A1 | 5/2015 | Wijnands et al. | 370/390 |
| 2015/0138961 A1 | 5/2015 | Wijnands et al. | 370/228 |
| 2015/0139228 A1 | 5/2015 | Wijnands et al. | 370/390 |
| 2015/0172190 A1 | 6/2015 | Song | |

(56) References Cited

U.S. PATENT DOCUMENTS

| | | |
|---|---|---|
| 2015/0181309 A1 | 6/2015 | Wijnands et al. ............ 725/109 |
| 2015/0249587 A1 | 9/2015 | Kozat ............................ 370/222 |
| 2015/0319086 A1 | 11/2015 | Tripathi |
| 2015/0334006 A1 | 11/2015 | Shao ............................. 370/225 |
| 2016/0087890 A1 | 3/2016 | Przygienda |
| 2016/0119159 A1 | 4/2016 | Zhao ............................. 370/390 |
| 2016/0134518 A1 | 5/2016 | Callon |
| 2016/0134535 A1 | 5/2016 | Callon |
| 2016/0142248 A1 | 5/2016 | Thubert et al. ............... 370/372 |
| 2016/0182353 A1 | 6/2016 | Garcia-Luna-Aceves .... 709/241 |
| 2016/0191372 A1 | 6/2016 | Zhang ........................... 370/390 |
| 2016/0205588 A1 | 7/2016 | Liu ................................ 370/392 |
| 2016/0218961 A1 | 7/2016 | Lindem ......................... 370/389 |
| 2016/0226725 A1 | 8/2016 | Iizuka |
| 2016/0025499 A1 | 9/2016 | Eckert ........................... 370/225 |
| 2016/0344616 A1 | 11/2016 | Roch |
| 2017/0012880 A1 | 1/2017 | Yang |
| 2017/0099232 A1 | 4/2017 | Shepherd ...................... 370/390 |
| 2017/0126416 A1 | 5/2017 | McCormick |
| 2017/0302566 A1 | 10/2017 | Zhang |
| 2018/0102965 A1 | 4/2018 | Hari |
| 2018/0205565 A1 | 7/2018 | Wijnands et al. |
| 2018/0205636 A1 | 7/2018 | Hu |
| 2018/0278470 A1 | 9/2018 | Wijnands et al. ............ 370/390 |
| 2018/0309664 A1 | 10/2018 | Balasubramanian |
| 2019/0014034 A1 | 1/2019 | Allan |
| 2019/0075041 A1 | 3/2019 | Wang |
| 2019/0116114 A1 | 4/2019 | Chen |

FOREIGN PATENT DOCUMENTS

| | | | |
|---|---|---|---|
| CN | 101242413 | 8/2008 | |
| CN | 101385 275 | 3/2009 | ............. H04L 12/18 |
| CN | 101572667 | 11/2009 | ............. H04L 12/56 |
| CN | 101689 172 | 3/2010 | |
| CN | 102025538 | 4/2011 | |
| CN | 102577 238 | 7/2012 | ............. H04L 12/18 |
| WO | WO 2007/095331 | 8/2007 | .................... 370/390 |

OTHER PUBLICATIONS

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Artel Video Systems, White Paper; "The Broadcaster's Guide to SMPTE 2022: Applications in Video Contribution and Distribution," Oct. 2014, pp. 1-7.

Bates, T. et al., "Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-to-End Quality of Service Model," Aug. 2005, pp. 1-18.

Deering, S., Cisco Systems, Inc. and R. Hinden, Nokia, "Internet Protocol, Version 6 (IPv6)," Network Working Group, Request for Comments 2460, Dec. 1998, pp. 1-39.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc., "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet-Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using BIER, draft-rosen-13vpn-mvpn-bier-01," Internet Engineering Task Force, Internet-Draft, Oct. 16, 2014, pp. 1-9.

Schulzrinne, H. et al.,; "RTP: A Transport Protocol for Real-Time Applications," Network Working Group, Request for Comments 3550, Jul. 2003, pp. 1-89.

SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.

SMPTE, "Transport of High Bit Rate Media Signals Over IP Networks (HBRMT)," ST 2022-6:2012, © 2015 by the Society of Motion Picture and Television Engineers, Inc. (SMPTE), p. 1.

SMPTE, "Definition of Vertical Interval Switching Point for Synchronous Video Switching," RP 168:2009, © 2015 by the Society of Motion Picture and Television Engineers, Inc. (SMPTE), p. 1.

Whitcomb, Leigh, "Real-Time Professional Broadcast Signals Over IP Networks," Harris Corporation, Technology Conference, Apr. 2011, pp. 1-60.

Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.

Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.

Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.

Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.

Xu, X. et al., "BIER Encapsulation, draft-xu-bier-encapsulation-00," Network Working Group, Internet-Draft, Sep. 30, 2014, pp. 1-6.

Xu, X. et al., "BIER Encapsulation, draft-xu-bier-encapsulation-01," Network Working Group, Internet-Draft, Oct. 20, 2014, pp. 1-6.

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

(56) References Cited

OTHER PUBLICATIONS

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].
Eckert, Toerless et al., "Traffic Engineering for Bit Indexed Explicit Replication", U.S. Appl. No. 14/814,574, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).
Wang, Xiaorong et al., et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).
Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).
Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).
Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).
Microsoft, "IPv6 Addressing (TechRef)"; Apr. 3, 2011; https://technet.microsoft.com/en-us/library/dd392266(v=ws.10).aspx; pp. 1-30.
Li, Tony et al., "IGP Requirements for Traffic Engineering With MPLS, draft-li-mpls-igp-te-00.txt," Network Working Group, Internet-Draft, Feb. 1999, pp. 1-6.
Moy, J., Ascend Communications, Inc., "OSPF Version 2," Network Working Group, Request for Comments 2328, Apr. 1998, pp. 1-244.
Psenak, P. et al., "OSPF Extensions for Segment Routing, draft-psenak-ospf-segment-routing-extension-05," Open Shortest Path First IGP, Internet-Draft, Jun. 2014, pp. 1-33.
Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.
Wijnands, Ijsbrand et al., "Bit Indexed Explicit Replication Using Internet Protocol Version 6"; U.S. Appl. No. 15/919,552, filed Mar. 13, 2018 consisting of Specification, Claims, Abstract, and Drawings (49 pages).
Eckert, Toerless et al., "Traffic Engineering for Bit Indexed Explicit Replication"; U.S. Appl. No. 16/457,339, filed Jun. 28, 2019; consisting of Specification, Claims, Abstract, and Drawings (88 pages).
Wijnands, Isjbrand et al., "Bit Indexed Explicit Forwarding Optimization"; U.S. Appl. No. 16/525,649, filed Jul. 30, 2019; consisting of Specification, Claims, Abstract, and Drawings (49 pages).
Wang, Xiaorong et al., "Multicast Traffic Steering Using Tree Identity in Bit Indexed Explicit Replication (BIER)"; U.S. Appl. No. 16/557,065, filed Aug. 30, 2019; consisting of Specification, Claims, Abstract, and Drawings (96 pages).

* cited by examiner

Bit Indexed Routing Table X — 502

| BFR-ID (SI:BP) | BFR Prefix | NBR |
|---|---|---|
| 5 (0:10000) | L | C |
|  |  | D |
| 4 (0:01000) | O | B |
| 3 (0:00100) | N | A |
|  |  | B |
| 2 (0:00010) | M | A |
|  |  | D |
| 1 (0:00001) | P | A |
|  |  | B |
|  |  | C |
|  |  | D |

FIG. 5A

BIFT X — 504

| FBM | NBR |
|---|---|
| 00111 | A |
| 01101 | B |
| 10001 | C |
| 10011 | D |

FIG. 5B

ECMP Mapping Table — 602

| Bit | Table 1 | Table 2 | Table 3 | Table 4 |
|---|---|---|---|---|
| 1 | A | B | C | D |
| 2 | A | D | A | D |
| 3 | A | B | A | B |
| 4 | B | B | B | B |
| 5 | C | D | C | D |

*FIG. 6*

702 — BIFT X1

| FBM | NBR |
|---|---|
| 00111 | A |
| 01000 | B |
| 10000 | C |
| 00000 | D |

*FIG. 7A*

704 — BIFT X2

| FBM | NBR |
|---|---|
| 00000 | A |
| 01101 | B |
| 00000 | C |
| 10010 | D |

*FIG. 7B*

706 — BIFT X3

| FBM | NBR |
|---|---|
| 00110 | A |
| 01000 | B |
| 10001 | C |
| 00000 | D |

*FIG. 7C*

708 — BIFT X4

| FBM | NBR |
|---|---|
| 00000 | A |
| 01100 | B |
| 00000 | C |
| 10011 | D |

*FIG. 7D*

802 — BIFT X

| Bit | FBM | NBR |
|---|---|---|
| 1 | 00111 | A |
| 1 | 01101 | B |
| 1 | 10001 | C |
| 1 | 10011 | D |
| 2 | 00111 | A |
| 2 | 10011 | D |
| 3 | 00111 | A |
| 3 | 01101 | B |
| 4 | 01101 | B |
| 5 | 10001 | C |
| 5 | 10011 | D |

*FIG. 8*

EQUAL COST MULTI-PATH WITH BIT INDEXED EXPLICIT REPLICATION

RELATED APPLICATIONS

This application claims the domestic benefit under Title 35 of the United States Code § 119(e) of U.S. Provisional Patent Application Ser. No. 61/931,473, entitled "Bit Mask Forwarding Architectures for Stateless Multipoint Replication," filed Jan. 24, 2014, which is hereby incorporated by reference in its entirety and for all purposes as if completely and fully set forth herein.

This application is also a continuation-in-part of U.S. application Ser. No. 14/488,790, entitled "Bit Indexed Explicit Replication Using Multiprotocol Label Switching," filed Sep. 17, 2014, which in turn claims the domestic benefit under Title 35 of the United States Code § 119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,761, entitled "Bit Indexed Explicit Replication," which in turn claims the domestic benefit under Title 35 of the United States Code § 119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,810, entitled "Bit Indexed Explicit Replication Using Internet Protocol Version 6," filed Sep. 17, 2014, which in turn claims the domestic benefit under Title 35 of the United States Code § 119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Each of the two provisional and three non-provisional applications referenced above is hereby incorporated by reference in its entirety and for all purposes as if completely and fully set forth herein.

BACKGROUND OF THE INVENTION

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. In many networks, multicast is the preferred method of data forwarding. One reason for this is that multicast is a bandwidth-conserving technology that reduces traffic by simultaneously delivering data to multiple receivers. However, in traditional multicast systems, a relatively large amount of control plane information is used. Setting up and maintaining this control information has a tendency to become complex and costly in terms of computing resources, and can become a major limiting factor in overall network performance. Another issue with multicast is that due to packet delivery mechanisms used, packets are sometimes forwarded to locations where the packets were not desired. This unnecessary delivery of packets represents an unwelcome burden on network performance. Overcoming this burden by traditional means involves generation and maintenance of even more control plane information.

BRIEF DESCRIPTION OF THE DRAWINGS

The present disclosure may be better understood, and its numerous objects, features, and advantages made apparent to those skilled in the art by referencing the accompanying drawings.

FIG. 5A is an example table generated by node, according to the present description.

FIG. 5B is an example table generated by node, according to the present description.

FIG. 6 is an example table generated by node, according to the present description.

FIG. 7A is an example table generated by node, according to the present description.

FIG. 7B is an example table generated by node, according to the present description.

FIG. 7C is an example table generated by node, according to the present description.

FIG. 7D is an example table generated by node, according to the present description.

FIG. 8 is an example table generated by node, according to the present description.

DETAILED DESCRIPTION

Overview

Various systems and methods for performing bit indexed explicit replication (BIER). For example, one method involves receiving a packet at a node. The packet includes a bit string. The node selects forwarding information based on a flow value associated with the packet. The forwarding information includes a forwarding bit mask. The node then forwards the packet based on the bit string and the forwarding information.

Multicast

Multicast delivers multicast data packets (data packets that traditionally include information identifying a multicast group, such as a multicast group address) from a source to multiple receivers without unduly burdening the source. As used herein, the term "receiver" signifies a host (such as a computing device or application) that subscribes to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

Figure 1:
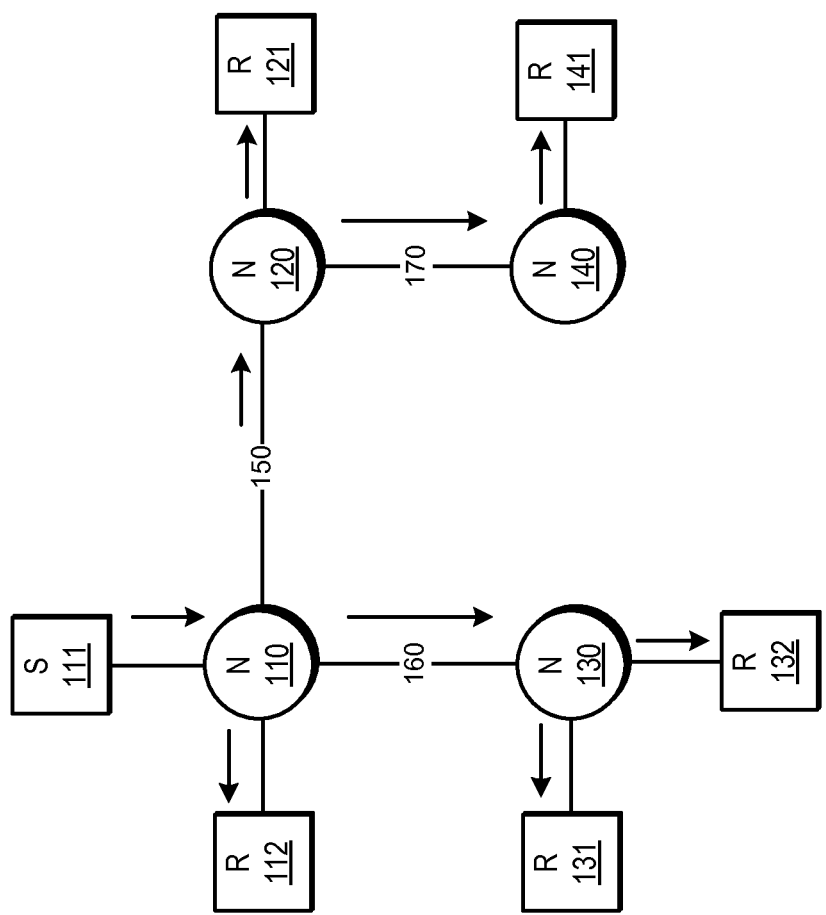
FIG. 1 is a simplified block diagram illustrating certain components of an example network.

FIG. 1 is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and receiver 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110 (illustrated by the arrow from 111 to 110). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected to a multicast distribution tree (MDT) to one or more receivers for the multicast group (e.g., a host that has sent a join message, as described above). Multicast-enabled node 110 then replicates multicast data packets in the multicast flow and transmits the replicated multicast data packets from the identified interfaces to receiver 112, multicast-enabled node 120, and multicast-enabled node 130.

Multicast-enabled nodes 120 and 130 inform node 110 that they are coupled to one or more receivers using join messages, for example, a protocol independent multicast (PIM) join message. In response to receiving the join messages, multicast-enabled node 110 updates its multicast forwarding tables to identify interfaces to which multicast data packets should be forwarded. The multicast data packets can be replicated by node 110 as needed in order to provide the multicast data packets to receivers for the multicast group (e.g., receivers 131 and 132) and other multicast-enabled nodes on the MDT (e.g., multicast-enabled node 140). In this manner, a multicast flow from source 111 can be transmitted through a multicast network to multiple receivers.

As can be seen, the process traditionally used in multicast of setting up MDTs and updating multicast forwarding tables for each group results in considerable amounts of state information within the network. The multicast forwarding tables maintained by each multicast-enabled node, in particular, can become quite large. Maintaining such multicast forwarding tables represents limitations on network scalability.

Bit Indexed Explicit Replication

As described below, techniques are used to attach receiver information to packets in the form of bits and forward the packets based on the receiver information. This greatly reduces the amount of state information stored at nodes and is therefore also referred to as "stateless multicast." More formally, the term Bit Indexed Explicit Replication (BIER) is used to describe these techniques. As suggested by the term, a bit position is used as an index into a forwarding table and packets are replicated only to specified nodes. BIER enables packets to be forwarded from a source to multiple receivers without the use of multicast distribution trees and per-group state information at each node between the source and receivers.

Figure 2:
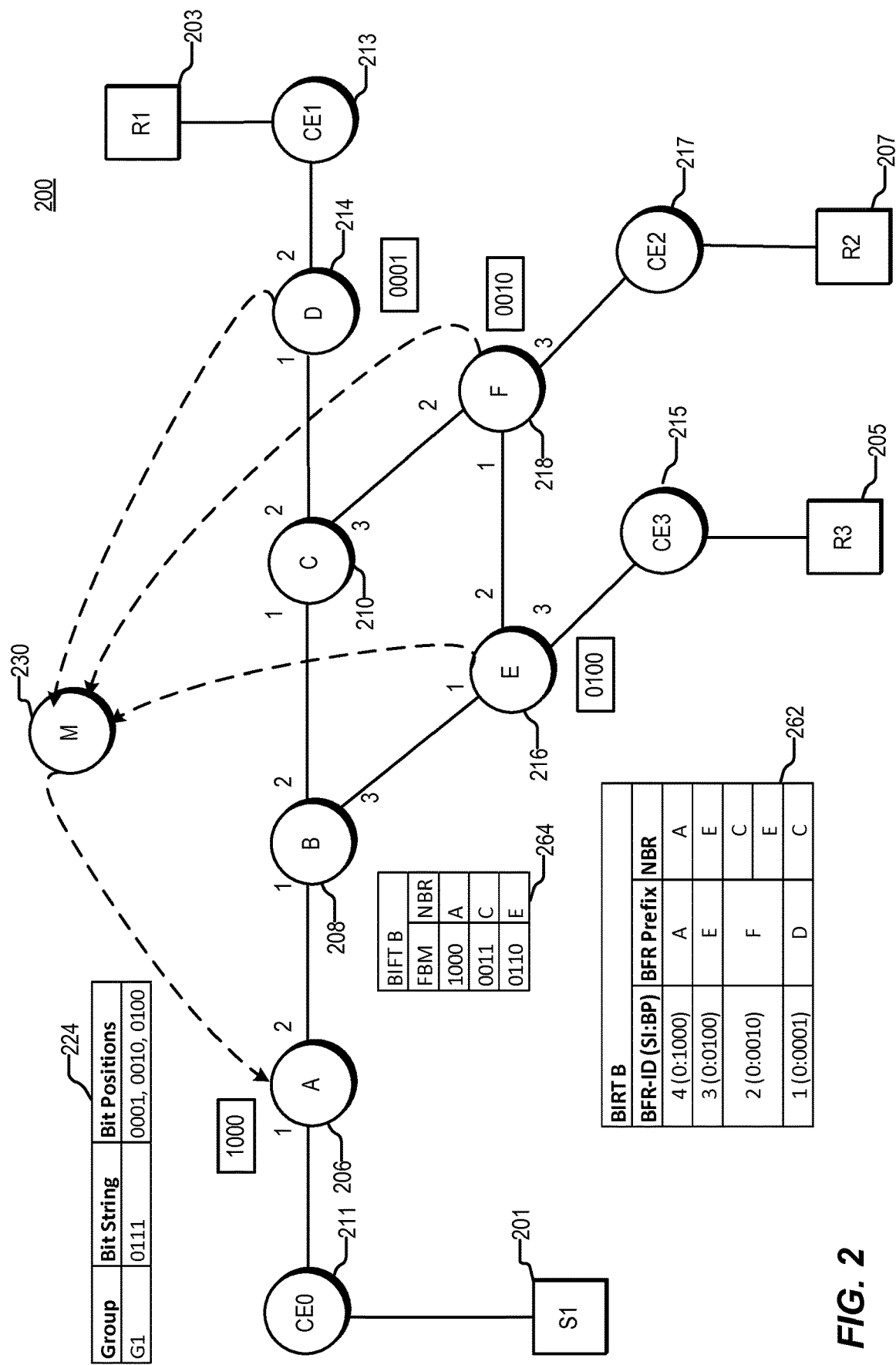
FIG. 2 is a simplified block diagram illustrating certain components of an example network.

FIG. 2 shows an example network 200. Network 200 includes BIER-enabled nodes 206-218. BIER-enabled nodes are configured to forward packets using BIER, and are sometimes referred to as bit forwarding routers (BFRs). BIER-enabled nodes 206-218 form a provider network, or domain. Such a provider network could be employed by an Internet service provider to transport packets to customers. The domain includes transit nodes 208 and 210, and provider edge nodes 206, 214, 216, and 218. The provider edge nodes are coupled to customer edge nodes 211, 213, 215, and 217. Hosts 201, 203, 205, and 207 are computing devices coupled to the customer edge nodes.

Each of the BIER-enabled nodes 206-218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, a prefix, or a loopback address. Each BIER-enabled node advertises or floods the routable address to all other BIER-enabled nodes in network 200. Each BIER-enabled node builds a unicast topology of the BIER-enabled nodes in network 200 using the advertised routable addresses. In one embodiment, the router identifier can be mathematically converted to the set identifier and bit position assigned to a BIER-enabled node. The conversion depends on the length of bit string being used. For example, to convert a router identifier 'N' to a set identifier and bit position, the set identifier is the integer part of the quotient (N−1)/BitStringLength. The bit position is ((N−1) modulo BitStringLength)+1. If, in the above example, N equals 257 and the BitStringLength is 256, the SI is 1 and the BP is 1. BIER network 200 also includes a node configured to operate as a multicast data controller (MDC) 230. The MDC performs configuration and administrative tasks, as described below.

BIER-enabled node 206 is configured as a bit forwarding ingress router (BFIR) for multicast data packets. BIER-enabled node 206 is coupled, via customer edge node 211, to source 201. Multicast data packets from source 201 enter the BIER network via the BFIR (BIER-enabled node 206). Each of BIER-enabled nodes 214, 216, and 218 is configured as a bit forwarding egress router (BFER). The BFERs can be connected (directly or via customer edge routers) to hosts, such as receivers, or other networks. A BFER is a BIER-enabled node that is the last BIER-enabled node on a path between a source and a receiver. The BFER may be a provider edge (PE) node that is coupled to the receiver either directly or indirectly (e.g., through a non-BIER-enabled CE node).

Assigning a Bit Position in the Bit String

Each BFER in a BIER network is assigned a bit position (BP) from a set or array of bits. The array of bits can be carried in a packet or other network message. The array of bits can also be stored in forwarding and/or routing tables. For the sake of clarity, the terms used herein are "bit string" (when the array of bits is in a packet) and "bit mask" (when the array of bits is stored in a table). Also, it is noted that BFIRs can act as BFERs and vice versa. BFIRs are also assigned bit positions.

The bit string (or bit mask) can have a fixed or variable length. The length of the bit string used in the BIER network can be statically configured or dynamically assigned, and is distributed through the BIER network. In one embodiment, the length of the bit string is between 256 and 1024 bits, though shorter or longer bit strings can be used. The maximum length of the bit string value is determined, in one embodiment, by hardware or software limitations of the BIER-enabled nodes in the BIER network. In one embodiment, different BIER-enabled nodes in the BIER network use different lengths for their respective bit strings. For example, one BIER-enabled node may have a maximum bit string length of 128 bits while another BIER-enabled node may have a maximum bit string length of 256 bits. A bit string is one type of multicast forwarding entry in which each bit position of multiple bit positions is an element that can be used to represent an individual node or interface. Other types of multicast forwarding entries with other types of elements can be used.

A bit position (BP) is statically or dynamically assigned to each BFER. Each BFER should have at least one unique bit position from the bit string. In one embodiment, a central authority, such as a multicast domain controller, will assign the BPs to the BFERs. The multicast domain controller, in one embodiment, assigns multiple BPs to a single BFER, e.g., a unique BP for each of one or more interfaces included in the BFER. Other mechanisms for assigning BPs can be implemented as well, such as deriving a BP from a router identifier assigned to a BIER-enabled node, where the derivation utilizes a mapping algorithm. In some embodiments, a bit position in the bit string is assigned to a single BFER. In other embodiments, a single BP can be assigned to more than one BFER. When multiple BFERs are assigned the same BP, one of the multiple BFERs can assume ownership of the BP at a given time, and ownership can be transferred between the multiple BFERs. Ownership of the BP can be transferred to another one of the multiple BFERs for any of several reasons, such as a failover in response to a node or link failure, or if one of the multiple BFERs otherwise becomes unavailable, in response to changing network conditions, due to time-sharing considerations, and the like. Assigning one BP to multiple BFERs facilitates operation similar to anycast, in which packets are forwarded to one receiver of a group of receivers, where each receiver in the group of receivers uses a common address.

Only the BIER-enabled edge nodes (e.g., BFERs and BFIRs) in a BIER network are assigned a BP. All other BIER-enabled nodes in the network (e.g., transit nodes) don't need a BP to participate in BIER. This helps to reduce the number of bits assigned in a network. As shown in the example of FIG. 2, network 200 utilizes a four bit long bit string. Each of the four BFERs (including BFIR node 206) in network 200 is assigned a BP: node 206 is assigned BP {1000}; node 214 is assigned BP {0001}; node 216 is assigned BP {0100}; and node 218 is assigned BP {0010}.

Sets

The number of BFERs that can be addressed (assigned a BP) is limited by the size of the bit string included in the multicast data packet. If the bit string is four bits long, the number of BFERs that can be addressed is four. The concept of sets allows an increase in the number of BFERs that can be assigned BPs. The set identifier (SI) is, for example, a number between 0 and 255. The SI allows a BP to be unique in the context of a set. For example, each BP can be re-used in each set. In an embodiment with 256 sets and a bit string length of 256 bits, 65536 (256×256) BFERs can be supported. In one embodiment, BIER-enabled nodes in the BIER network generate separate forwarding information for each SI. For example, if two different set identifiers are in use in the BIER network, the BIER-enabled nodes generate two bit indexed forwarding tables (BIFTs), one corresponding to each SI. In response to receiving a multicast data packet having a SI, the BIER-enabled node uses the SI to select which forwarding information (e.g., BIFT) to use to forward the multicast data packet.

Signaling

When a receiver (e.g., a host, such as host 203 of FIG. 2) wishes to join a multicast group, the receiver sends membership information (e.g., using Internet Group Management Protocol (IGMP)) to the BFER the receiver is coupled to (either directly or indirectly). The membership information identifies the multicast group the host wishes to join and optionally identifies a source associated with the multicast group. In the example of FIG. 2, host 203 can send an IGMP message to CE node 213 and CE node 213 can then forward the IGMP message to BIER-enabled node 214. In response to receiving a message indicating a receiver wishes to join a multicast group, the BFER signals its interest in the multicast group identified in the message. This involves, in one embodiment, the BFER sending a membership message to any BFIRs in the network, or to a controller, indicating the BFER's interest in the multicast group. The membership message includes, in one embodiment, the BFER's BP. Alternatively, the BFIR performs a lookup to determine the BP associated with the BFER that originated the membership message using the address of the BFER that originated the membership message and the information advertised via IGP, e.g., information in the BFIR's BIRT. In one embodiment, BFERs use border gateway protocol (BGP) to send membership messages.

The BFER can send the membership message only to some or all of the BIER-enabled nodes on the edge of the BIER network (BFIRs and BFERs) or can flood the signaling message to all nodes in the network. For example, if the network is using source-specific multicast (SSM), the BFER knows the source of the multicast group (e.g., from the IGMP message received from the receiver) and can look up a path to the specified BFIR and send the signaling message to that BFIR only. If SSM is not the type of multicast being used, the BFER can flood the signaling message to all candidate BFIRs. Only BIER-enabled edge nodes parse the message to determine group and BP information, all other nodes can discard the message. Receivers joining and unsubscribing from multicast groups do not create churn or require any changes in the state information (e.g., bit indexed forwarding tables) maintained by the core BIER-enabled nodes, unlike with traditional multicast. Instead, join or unsubscribe messages signal BFIRs to update the bit string associated with a given multicast group. This involves only the BFIRs updating state information (e.g., updating a group membership table associated with the group) and not the core nodes. This represents a significant improvement over traditional multicast, in which multicast distribution trees are set up and torn down throughout the network based on the join and unsubscribe messages.

A BFIR, such as BIER-enabled node 206 of FIG. 2, maintains state information that includes an entry for each multicast group for which the BFIR has received a membership message. In one embodiment, the BFIR maintains the state in a group membership table (GMT), as shown at 224 of FIG. 2. In one embodiment, each entry in the GMT includes information identifying the multicast group (such as a multicast group name and/or an address of a source for the multicast group), a list of BPs corresponding to BFERs that have expressed interest (e.g., via a membership message) in the multicast group identified in the group field, and a bit string, which identifies all of the BFERs that have expressed interest in the multicast group (e.g., by having a bit set in the bit position corresponding to each BFER that has expressed interest in the multicast group). In response to receiving a membership message from a BFER indicating that the BFER is interested in a multicast group, the BFIR sets the bit corresponding to the BFER's BP in the bit string that corresponds to the multicast group. When the BFER is no longer interested in receiving multicast data packets for the multicast group, the BFER signals to the BFIR, e.g., using an unsubscribe message, and the BFIR clears the corresponding bit in the bit string.

The BIER network forwards multicast data packets through the BIER network based on the bit string. The BFIR transmits the bit string along with multicast data packets into the BIER network. There are number of different techniques available for transmitting the bit string. This description refers to encapsulating the bit string into the multicast data packet. This terminology covers not only incorporating the BM into the multicast data packet (e.g., as header or payload information), but also appending or prepending some or all of the bit string to the multicast data packet.

Figure 3A:
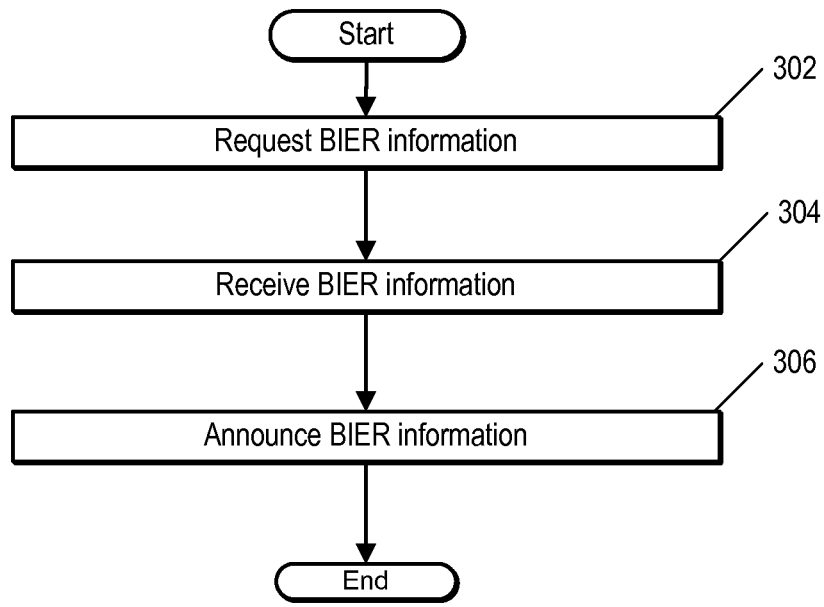
FIG. 3A is a flow chart illustrating an example process employed by a node, according to the present description.

FIG. 3A is a flowchart that illustrates the operations discussed above. In one embodiment, the method is performed by a BFER, such BFR 214 of FIG. 2. At 302, the BFER requests BIER information, such as a bit position and set identifier. Requesting BIER information involves, in on embodiment, the BFER sending a message to a multicast domain controller, such as multicast domain controller 230 of FIG. 2. In one embodiment, the BIER information is automatically provided to the BFER in response to detecting the BFER has joined the network, or in response to some other condition. An administrator can manually configure the BFER with a BP and set identifier.

At 304, the BFER receives the BIER information, either as a result of administrative configuration, or, for example, included in a message from the MDC in response to the request for BIER information. At 306, in response to the BFER receiving the BIER information, the BFER advertises its BIER information and its router identifier, to some or all of the other nodes in the BIER network. In one embodiment, the BFER advertises its BP and SI via an interior gateway protocol (IGP). For example, Intermediate System to Intermediate System (ISIS) and/or Open Shortest Path First (OSPF) can be modified to assist in distributing this information through the BIER network using link state updates. Other flooding mechanisms to distribute the information are possible. All BIER-enabled nodes in a BIER network, not just the BFERs, also flood their router identifier, which is used in building network topology and unicast forwarding tables. BIER-enabled nodes, in one embodiment, advertise additional information as well, such as a bit string size that the BIER-enabled node is configured to use. Adding such BIER information to the advertised information is a relatively small amount of additional information, as compared with the state information maintained on a per-group basis in traditional multicast.

Figure 3B:
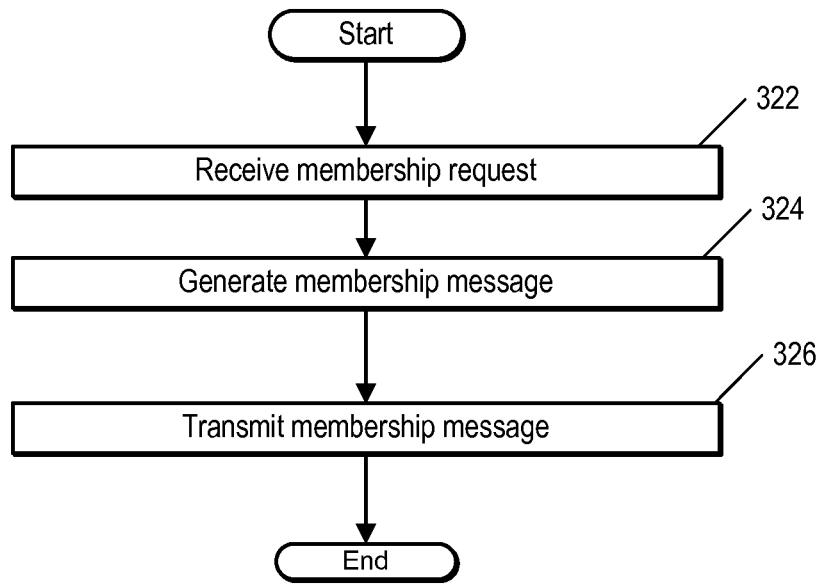
FIG. 3B is a flow chart illustrating an example process employed by a node, according to the present description.

FIG. 3B shows an example method of utilizing overlay signaling to distribute membership information in a BIER network. In one embodiment, the method of FIG. 3B is performed by a BFER, such as BIER-enabled node 214 of FIG. 2.

At 322, the BFER receives a membership request from a host, such as host 203 of FIG. 2. The membership request is optionally relayed through a customer edge node, such as customer edge node 213 of FIG. 2. In one embodiment, the membership request comprises an IGMP message. The membership request includes information identifying a multicast group, and information identifying whether the host wishes to join, e.g. subscribe, or leave, e.g. unsubscribe from, the multicast group. In response to receiving the membership request, the BFER updates forwarding information indicating the host's membership in the multicast group. For example, if the membership request indicates that the host wishes to join multicast group G1, the BFER updates a forwarding entry such that any multicast data packets received by the BFER and addressed to multicast group G1 will be forwarded to the host by the BFER.

At 324, the BFER generates a membership message. The membership message signals the BFER's interest in the multicast group. In one embodiment, the membership message is implemented using BGP. The membership message carries information identifying the multicast group, and information identifying the BFER, such as the set identifier and bit position of the BFER.

At 326, the BFER transmits the membership message. In one embodiment, transmitting the membership message involves forwarding the membership message to a multicast domain controller, such as MDC 230 of FIG. 2. The MDC then transmits the membership message to some or all of the edge routers in the BIER domain, e.g., BFERs and BFIRs.

Bit Indexed Routing and Forwarding Tables

Each BIER-enabled node in the BIER network uses the advertised BPs and router identifiers of the other BIER-enabled nodes to generate one or more bit indexed routing tables (BIRTs) and bit indexed forwarding tables (BIFTs). The BIER-enabled nodes use these tables to forward multicast data packets. A bit indexed routing table, as shown by example BIRT 262 of FIG. 2, is a table that stores BP-to-router identifier mappings, e.g., as learned via an interior gateway protocol (IGP). Each BIER-enabled node receives BP-to-router identifier mappings and stores them in a BIRT. Using the router identifiers, a BIER-enabled node performs a recursive lookup in unicast routing tables to identify a directly connected next hop BIER-enabled node (referred to herein as a neighbor (NBR)) on the shortest path from the BIER-enabled node toward the BIER-enabled node associated with the BP. In one embodiment, the NBR is the next hop on a shortest path (SPT) towards the BFER that advertised the BP. In one embodiment, the BIRT includes one entry per BP. As discussed further below, when multiple equal-cost paths exist to a given BFER, the BIRT includes multiple entries for the BP associated with the BFER.

Each BIER-enabled node translates its BRT(s) into one or more bit indexed forwarding tables (BIFTs). FIG. 2 illustrates an example BIFT 264 as generated by BIER-enabled node B 208. Generating a BIFT involves, in one embodiment, first sorting the BIRT by neighbor. For entries in the BIRT that have a common NBR, the bit masks of those entries are OR'd together, creating a bit mask that is a combination of the BPs from those entries. This is referred to herein as a forwarding bit mask (FBM) or just bit mask (BM). Each bit that is set in the FBM indicates a BFER that is reachable via the neighbor associated with the FBM in the BIFT. Multicast data packets are forwarded by the BIER-enabled nodes using the BIFTs. For example, according to BIFT 264, if a multicast data packet having a bit string with BP {0001} set arrives at node 208, the multicast data packet should be forwarded to NBR C (BIER-enabled node 210 in the example of FIG. 2). If a multicast data packet arrives at node 208 having a BP of {1000} set, the multicast data packet should be forwarded to NBR A (BIER-enabled node 206 in the example of FIG. 2). If a multicast data packet arrives at node 208 having a bit string of {1001}, the multicast data packet should be forwarded to both NBR A and NBR C.

Packet Forwarding

After encapsulating the bit string into a multicast data packet, the BFIR forwards the multicast data packet to one or more BIER-enabled nodes using the BFIR's BFTS(s). A BIER-enabled node that receives the multicast data packet determines, using the bit string in the multicast data packet and the BIER-enabled node's own BFT(s), whether to forward the multicast data packet to one or more of its neighbors, and if so, to which one(s). To do so, the BIER-enabled node compares the bit string in the multicast data packet with the FBM entries in the BIER-enabled node's BFT. In one embodiment, the BIER-enabled node performs a logical AND operation between the multicast data packet's bit string and the FBMs in the BIER-enabled node's BFT. As noted, the BIER-enabled node's BFT includes, in one embodiment, an entry for each neighbor of the BIER-enabled node, and each entry includes a FBM field that indicates which BFERs are reachable along a shortest path via the neighbor identified in the entry. If the result of the AND is TRUE for a given neighbor, the BIER-enabled node forwards the multicast data packet to that neighbor. A TRUE result indicates that an FBM for a given neighbor in the BIER-enabled node's BIFT has one or more bits set to 1 and that a corresponding bit (or bits) in the multicast data packet's bit string is also set to 1. The set bits in the multicast data packet's bit string indicate which BFERs have expressed interest in the multicast group, and the set bit in the BIER-enabled node's BIFT entry indicates that the BFER that has expressed interest is reachable via the neighbor indicated in the entry. A BIER-enabled node forwards a multicast data packet that contains a bit string to all neighbors for which the bit-wise AND operation between the bit string in the multicast data packet and the FBMs in the BIER-enabled node's BIFT is TRUE.

In the example of FIG. 2, BIER-enabled node 214 (a BFER) signals to BIER-enabled node 206 (a BFIR) that BIER-enabled node 214 is interested in receiving packets associated with a given multicast group or flow. BIER-enabled nodes 216 and 218 likewise signal BIER-enabled node 206 that BIER-enabled nodes 216 and 218 are interested in the same multicast group. The signaling is represented by the dashed lines shown in FIG. 2. BIER-enabled node 206 updates an entry in group membership table 224 (or creates one if one does not already exist) for the multicast group and updates a bit string in the entry by setting bits corresponding to BIER-enabled nodes 214, 216, and 218. The bit string corresponding to the multicast group is {0111}.

BIER-enabled node 206 is configured to receive a multicast data packet addressed to the multicast group or flow (e.g., from source 201 via CE node 211). BIER-enabled node 206 uses the multicast group address and/or source address included in the multicast data packet to access its GMT and select a bit string associated with the multicast group. After selecting a bit string that corresponds to the multicast group from the GMT, BIER-enabled node 206 encapsulates the bit string for that multicast group into the multicast data packet and identifies the neighbors to which the packet will be forwarded (e.g., using its BFT). In one embodiment, this involves performing an AND operation between the bit string and each entry in BIER-enabled node 206's BIFT. In this example, there is only one entry in the BIFT and the entry corresponds to BIER-enabled node 208. This means that the shortest path from BIER-enabled node 206 to all three of the BFERs in network 200 runs through BIER-enabled node 208. Since the result of the AND is TRUE for NBR B (BIER-enabled node 208), BIER-enabled node 206 forwards the multicast data packet to BIER-enabled node 208. BIER-enabled node 206 also modifies the bit string in the multicast data packet it forwards, as discussed below.

In response to receiving the multicast data packet, BIER-enabled node 208 performs an AND between the bit string in the multicast data packet, {0111}, and each entry in its BIFT (shown at 264). The result for NBR C is TRUE so BIER-enabled node 208 forwards the multicast data packet to BIER-enabled node 210. BIER-enabled node 208 also modifies the bit string in the multicast data packet it forwards by clearing bits corresponding to BFERs that are not reachable via a shortest path through the BIER-enabled node to which the multicast data packet is being forwarded. In this example, since node E is not reachable via node C (the shortest path from node B to node E does not run through C), node B clears the bit corresponding to node E in the bit string that node B forwards to node C, Thus, node B forwards the multicast data packet to node C with the bit string {0011}. The result for NBR E is also TRUE, so BIER-enabled node 208 replicates the multicast data packet and forwards the multicast data packet to BIER-enabled node 216, which is a BFER. Node B updates the bit string and forwards the multicast data packet to node E with the bit string {0110}.

BIER-enabled node 210, in response to receiving the multicast data packet, performs an AND between the bit string in the multicast data packet, {0011}, and each entry in its BIFT and forwards the multicast data packet to BIER-enabled node 214 which is a BFER and BIER-enabled node 218. BIER-enabled node 216 also forwards the multicast data packet to BIER-enabled node 218. This results in BIER-enabled node 218 receiving duplicate copies of the multicast data packet. This occurrence is undesirable and results from the fact that two equal cost paths exist from BIER-enabled node 208 to BIER-enabled node 218. That is, as shown, node F is reachable using a single hop path from node B via node C or node E. This is known as equal cost multi-path (ECMP), and techniques are described below which address such situations.

ECMP

Forwarding a packet involves a node determining which neighbor the packet should be sent to in order to proceed by a shortest path towards the packet's destination. Sometimes there are multiple neighbors the packet could be forwarded to. For example, there can be multiple shortest paths from the node to the destination, or multiple equal cost paths. Cost of a path can be evaluated in terms of number of hops, type of links and/or nodes on the path (and the operating parameters, such as bandwidth and processing power, of the same), and the like. Nodes generate routing topologies by performing shortest path calculations using, for example, Dijkstra's Algorithm and routing information distributed by IGP.

When multiple equal cost paths exist from a node towards a packet's destination, the node should forward the packet along one and only one of the paths, e.g., to one and only one of the neighbors on a respective path. Forwarding the packet along more than one of the paths, e.g., to more than one of the node's neighbors, results in unwanted duplication. Duplication represents a burden both on the sending node, which replicates and forwards multiple copies of the packet, and the receiving node, which receives, buffers, and processes (e.g., drops) multiple packets where one packet would have sufficed. Additionally, packet duplication burdens the transmission media, such as network links, which typically have a fixed bandwidth capacity. Determining which path the packets should be forwarded on can be a complex task. Packets that are logically related, for example, packets that are part of the same multicast flow, should go via the same neighbor. Otherwise, if logically related packets are distributed across multiple paths, additional concerns regarding ordering of the packets are faced at the destination. One concern when handling ECMP is load balancing. It is desirable that each of the ECMP paths is utilized, rather than some of the paths being overburdened, and others being underutilized.

In typical multicast deployments, packets are forwarded using multicast distribution trees. Nodes can perform ECMP calculations as part of setting up the multicast distribution trees. For example, which upstream (towards the source) neighbor should be selected as the recipient of a join message can be determined using ECMP techniques. However, ECMP is not used in typical multicast deployments for forwarding decisions for forwarding multicast data packets to downstream nodes.

Traditionally, ECMP is resolved on a hop-by-hop basis. That is, each node that receives a packet determines or evaluates some ECMP criteria associated with the packet and selects a path accordingly. Performing ECMP determinations at each node can negatively impact forwarding performance. Doing so in the context of BIER would involve a node determining that multiple ECMP paths exist, and that a given packet should be sent to a node reachable via the ECMP paths. Performing these calculations in the data plane is complex. As an alternative, these calculations are performed in the control plane in conjunction with setting up the forwarding tables used by BIER nodes. Once ECMP paths are identified, and a node's forwarding information is configured accordingly for each ECMP path, the node can simply select which forwarding information to use (e.g., which ECMP path to forward the packet on). In one embodiment, the node uses information included in the packet to select between ECMP paths. For example, packets can include a value or field that is based on a multicast flow with which the packet is associated. Based on this value, the node can select an ECMP path and forward packets from the same multicast flow along a single ECMP path.

The present description relates primarily to ECMP paths to different neighbors. Another type of ECMP path involves multiple paths to the same neighbor, e.g., parallel interfaces. In the case of multiple paths to the same neighbor, the bit string for each ECMP path is the same for each candidate path. On the other hand, if the ECMP paths are to different neighbors, the bit string for each ECMP path is different for each neighbor.

Figure 4:
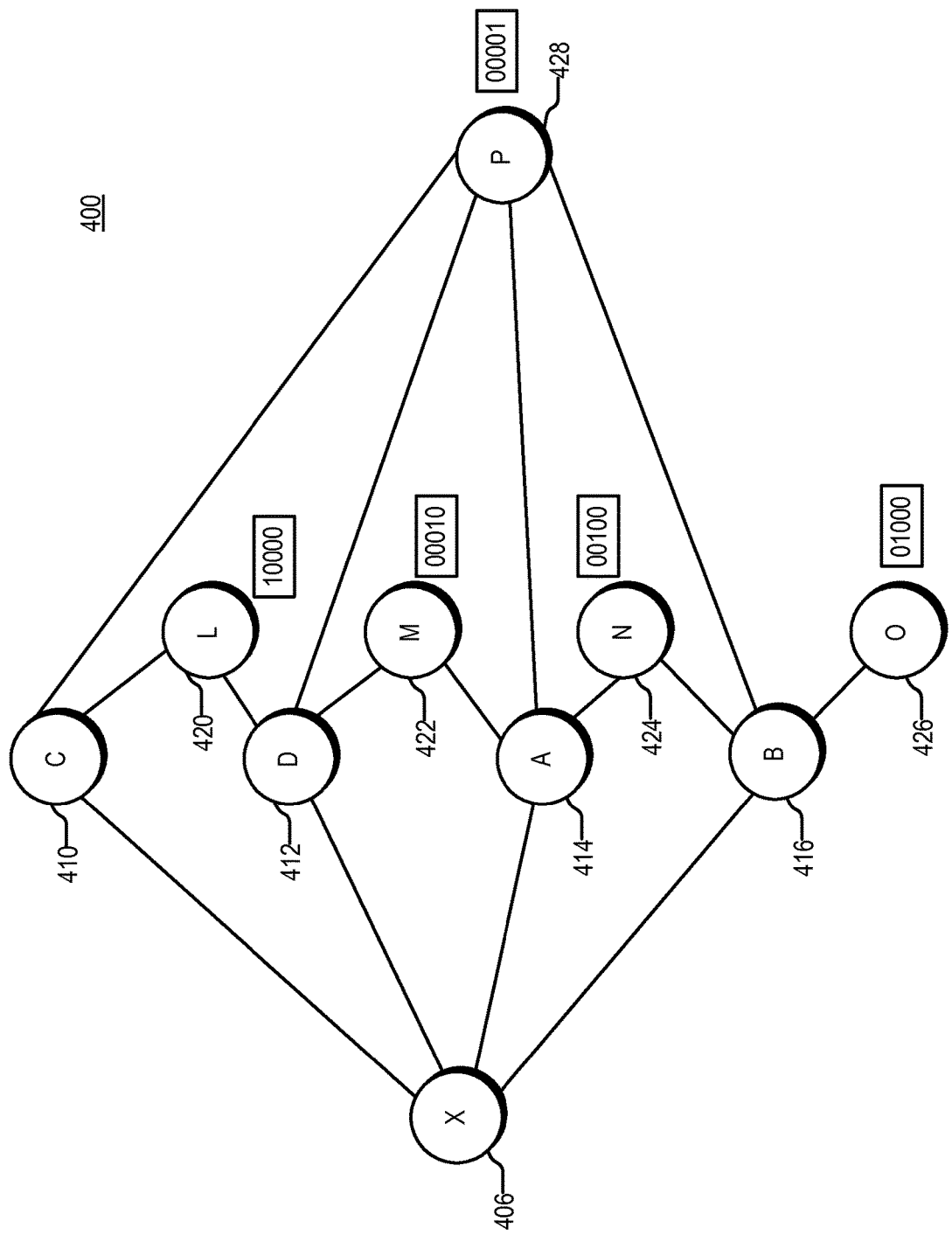
FIG. 4 is a simplified block diagram illustrating certain components of an example network.

FIG. 4 is a simplified block diagram illustrating certain components of an example network 400. BIER-enabled nodes 410 through 416 are BFRs configured as transit nodes. BIER-enabled nodes 420 through 428 are BFRs configured as BFERs, with bit positions assigned as shown. BIER-enabled node 406 is a BFR that can be either a transit node or a BFIR. In one embodiment, the BIER-enabled nodes are coupled directly or indirectly to one or more hosts (not shown), e.g., via one or more customer edge nodes (not shown). Network 400 also includes, optionally, a multicast data controller (not shown).

Network 400 includes a number of ECMP paths. For example, node X can reach node L via a shortest path through node C or a shortest path through node D. The cost of the paths is equal. Node X can reach node P through any of nodes A, B, C, or D. In response to receiving a multicast data packet, node X determines which of the neighbors the multicast data packet should be forwarded to. For example, if a multicast data packet has node L as a destination, e.g., the bit corresponding to BP {10000} is set in the multicast data packet's bit string, node X determines whether to forward the packet to node C or node D.

FIG. 5A is an example bit indexed routing table (BIRT) 502 generated by a BFR, such as node 406 of FIG. 4. BIRT 502 includes three columns. The first column includes information identifying a bit position and (optionally) set identifier for each BFER included in the BIER network (e.g., network 400 of FIG. 4). In one embodiment, the column also includes a BFR-ID, or virtual bit position. A virtual bit position can be implemented as an integer unique among the edge routers in a BIER network. The second column includes a routable address for each of the BFERs, such as a loopback or BFR prefix. The third column includes one or more entries for the neighbor or neighbors via which the BFER corresponding to the BFR prefix is reachable along a shortest path from the node. For example, the first row of BIRT 502 shows that two ECMP paths exist from node X to node L of FIG. 4, which has a bit position of {10000}. The first path is through neighbor C and the second path is through neighbor D. Table 502 also shows that BFER P, which has a bit position of {00001}, is reachable via neighbors A, B, C, and D from node X. Thus, BIRT 502 shows that there are four ECMP paths from node X to node B. A procedure for generating BIRTs is discussed in greater detail with regard to FIG. 10.

FIG. 5B is an example bit indexed forwarding table (BIFT) 504 generated, for example, by node 406 of FIG. 4. BIFT 504 is generated using the information in BIRT 502 of FIG. 5A. As shown, BIFT 504 includes a column for a forwarding bit mask (FBM). BIFT 504 also includes a column for neighbors. BIFT 504 indicates that each of the bit positions set in the FBM is reachable via the corresponding neighbor. For example, considering the first entry in BIFT 504, BFERs corresponding to bit positions 1, 2, and 3 are reachable via neighbor A. This is reflected in FIG. 4 as nodes P, M, and N are all reachable via node A. Additional details on generating BIFTs are discussed with regard to FIG. 11.

FIG. 6 is an example ECMP mapping table 602 generated, for example, by node 406 of FIG. 4. Considering BIFT 504 of FIG. 5B, the bit position 1 is set in each entry, e.g., for neighbor A, neighbor B, neighbor C, and neighbor D. Consider an example in which node X (406 of FIG. 4) receives a multicast data packet having a bit string of {11111}. In response to receiving the multicast data packet node X compares the bit string against the FBM corresponding to neighbor A. Since the result is true ({11111} AND {00111} equals {00111}), node X forwards a copy of the multicast data packet to neighbor A with a bit string of {00111}. Subsequently, node X compares the bit string against the FBM for neighbor B. Since the result is true, node X forwards another copy of the multicast data packet to neighbor B, this copy having a bit string {01101}, the result of an AND operation between the FBM and the bit string {11111}. This continues for node C and node D as well, with node X forwarding a copy of the multicast data packet to each of the nodes. Having BP 1 set in multiple entries of the BIFT represents an ECMP problem. Each of nodes A through D eventually forward copies of the multicast data packet to, for example, node P. Such duplication of multicast data packets is undesirable.

One way to prevent unwanted duplication of multicast data packets is to mask the bits in the incoming multicast data packet's bit string after each FBM comparison. That is, those bits that were set in a copy of an outgoing multicast data packet can be cleared before the incoming packet's bit string is compared against the next FBM. While this technique can be used to prevent unwanted packet duplication, load balancing is sacrificed. In the above example, the lower three bits were set in the copy of the multicast data packet sent to node A. If node X cleared those bits in the incoming packet's bit string before comparing the incoming packet's bit string with the FBM for node B, the outgoing bit string will not indicate that the packet should be sent to node P. That is, node X would compare {11000} with the entry for node B, and would forward a copy of the multicast data packet to node B with the bit string {01000}. A multicast data packet with the bit string {01000} will be forwarded to node N only. Thus, all packets to node P would go through node A. The resulting lack of load-balancing can be detrimental to network performance.

Another way to prevent performance degradation due to ECMP paths is to generate multiple BIFTs, where each bit position is set in at most one and only one FBM per BIFT. In response to receiving a multicast data packet at a BFR, the BFR selects one of the BIFTs and forwards the multicast data packet using the selected BIFT. The selection is based, in one embodiment, on a flow value carried in each multicast data packet. A BFR, such as node X of FIG. 4, generates such BIFTs, as shown at FIGS. 7A, 7B, 7C, and 7D. Generating the BIFTs involves, in one embodiment, generating and using an ECMP mapping table, as shown at ECMP mapping table 602 of FIG. 6.

Generating ECMP mapping table 602 involves, in one embodiment, determining the maximum number of EMCP paths at a BFR. For each bit position, the BFR counts how many FBMs in the BIFT have the bit position set. In the example of BIFT 504 of FIG. 5B, the maximum number is 4, corresponding to bit position 1. That is, bit position 1 is set in each of the four FBMs shown in FIG. 5B. The BFR generates a table that includes one row or entry for each bit position. This is shown in the first column of ECMP mapping table 602. The BFR also creates a column for each of the ECMP paths. Since four is the maximum number ECMP paths in BIFT 504, node X generates ECMP mapping table 602 with four additional columns. The BFR (node X in this example) then distributes information identifying the neighbors for which the corresponding bit position was set across the columns. The information can be distributed using, for example, round-robin, or some other algorithm.

For each bit position, the bit position is set at most one time in each given table. Which neighbor a multicast data packet having the bit position set should be forwarded to is entered in the columns corresponding to the bit position. Bit position 1 is set for four neighbors in BIFT 504. Each neighbor appears in a respective column of ECMP mapping table 602. Neighbor A appears in the first column, neighbor B appears in the second column, neighbor C appears in the third column, and neighbor D appears in the fourth column. This is reflected in the first row of table 602. This means that when BIFTs are generated for each column, the BIFT corresponding to the first column will have bit position one set for neighbor A, and only neighbor A. If this BIFT is selected for forwarding a multicast data packet, the multicast data packet will be forwarded to node P (which corresponds to BP 1) via neighbor A and only neighbor A. The BIFT corresponding to the second column will have bit position one set for neighbor B, and only neighbor B. If this BIFT is selected for forwarding a multicast data packet, the multicast data packet will be forwarded to node P (which corresponds to BP 1) via neighbor B and only neighbor B.

Bit position 2 is set once for neighbor A and once for neighbor D in bit forwarding table 504. This is reflected in the first two columns of the second row of ECMP mapping table 602. Since there are two ECMP paths associated with bit position 2, and there are 4 columns in the mapping table, each ECMP neighbor is repeated twice. Bit position 3 is set once for neighbor A and once for neighbor B. Similar to 2, these mappings are repeated in the third row of table 602. Bit position 4 is set only for neighbor B. Bit position 5 is set for neighbors C and D. In embodiments where the number of ECMP paths for a given bit position does not evenly divide into the maximum number of ECMP paths for the BIFT, an asymmetric distribution of neighbor information in the ECMP mapping table is performed.

Mapping table 602 is then converted by the BFR into four separate bit forwarding tables. As shown in FIG. 7A, bit forwarding table 702 corresponds to the table 1 column of mapping table 602. As shown in bit forwarding table 702, bits one, two, and three are set in the FBM corresponding to neighbor A, bit 4 is set in the FBM corresponding to neighbor B, and bit 5 is set in the FBM corresponding to neighbor C. Each of the five bit positions is only set once in BIFT 702. For example, bit position 1 is set only in the FBM corresponding to neighbor A. Thus, multicast data packets forwarded using BIFT 702 and having BP 1 set are forwarded to node P only through neighbor A. FIG. 7B shows BIFT 704, which corresponds to the table 2 column of mapping table 602. FIG. 7C shows BIFT 706, which corresponds to the table 3 column of mapping table 602. FIG. 7D shows BIFT 708, which corresponds to the table 4 column of mapping table 602.

FIG. 8 is an example BIFT generated by a BFR, such as node X (406) of FIG. 4. FIG. 8 shows an alternative BIFT 802. Rather than comparing an incoming bit string with each FBM entry in a BIFT, an alternative forwarding mechanism considers each bit in the bit string (walks the bit string as opposed to walking the BIFT). One advantage of this is that the maximum number of comparisons between the bit string and FBMs in the BIFT is limited to the length of the bit string, as opposed to being limited only by the number of neighbors, which can be large. In this example, only one forwarding table is used, and for each bit, a corresponding entry for each ECMP path is created. For bit position 1, which is set for each of the 4 neighbors, 4 FBM entries are created in the table. For bit position 2, which is set for 2 of the neighbors and BIFT 504, 2 FBM entries are created. Whether the multiple table mechanism described with regards to FIGS. 6, 7A, 7B, 7C, and 7D is used, or the single BIFT multiple entries method described with regard to FIG. 8, a selection mechanism to select between the tables (or entries) is used. For example, a flow value can be included in a multicast data packet. The flow value is consistent (e.g., the same value) for each multicast data packet in a given flow. Based evaluating the flow value, a BIFT (or entry) is selected. This insures that multicast data packets of the same flow are forwarded to the same neighbor and that different flows can be distributed among the ECMP paths. Additional details regarding generating the forwarding information, selecting the forwarding information, and forwarding multicast data packets is provided with regards to FIGS. 9 through 16B.

Figure 9:
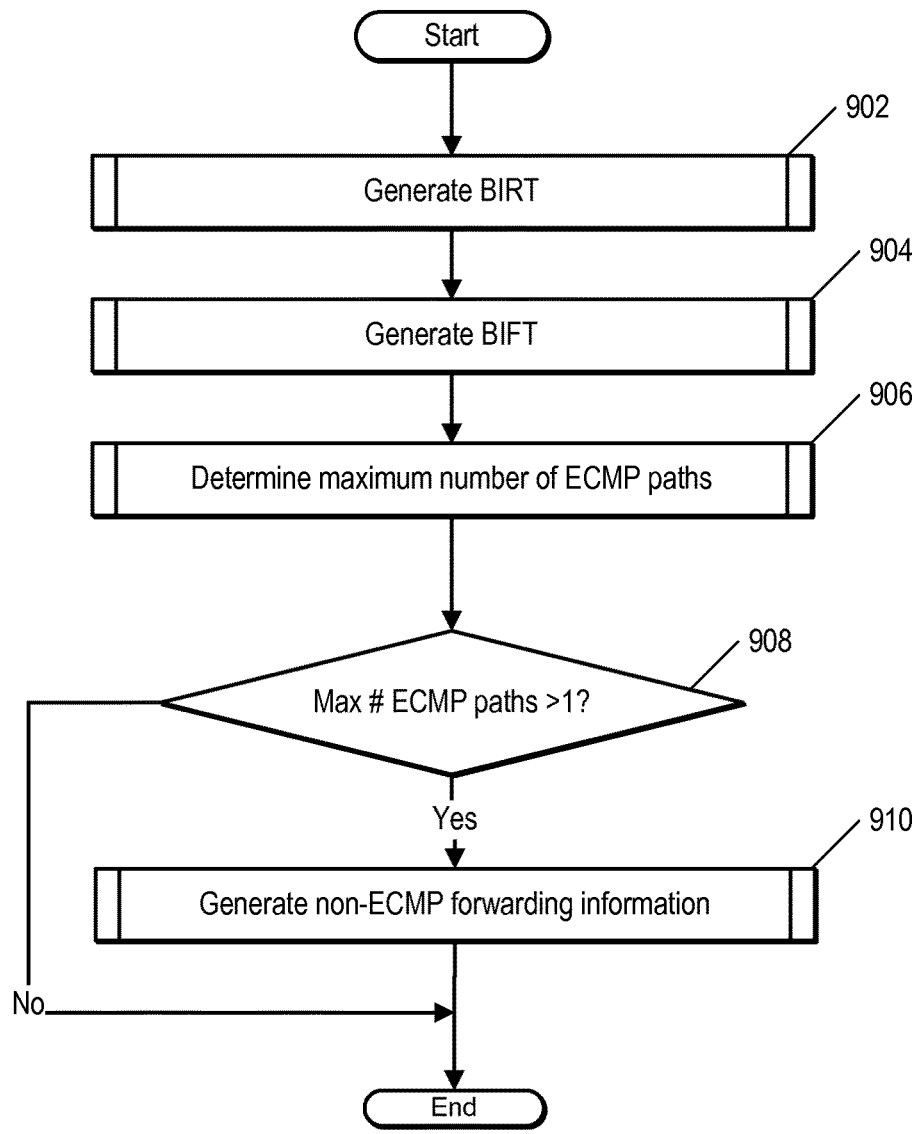
FIG. 9 is a flow chart illustrating an example process employed by a node, according to the present description.

FIG. 9 is a flow chart illustrating an example process employed by a node, according to the present description. FIG. 9 shows a method of generating forwarding information. In one embodiment, generating the forwarding information is performed by a bit forwarding router (BFR) such as BFR 406 of FIG. 4. The BFR generates BIER forwarding information, and then determines whether ECMP paths exist. If so, the BFR generates forwarding information which prevents ECMP problems, such as packet duplication.

At 902, the BFR generates a BIRT. In one embodiment, this involves receiving advertised BIER information, using, for example, IGP. Additional details regarding generating a BIRT are discussed with regard to FIG. 10. Using the BIRT generated at 902, the BFR generates a BIFT at 904. In one embodiment, generating a BIFT involves determining which BFERs are reachable via which neighbors and generating forwarding bit masks corresponding to the neighbors. Additional details of generating a BIFT are discussed with regard to FIG. 11.

At 906, the BFR determines the maximum number of ECMP paths, as indicated by the BIFT generated at 904. In one embodiment, this involves inspecting the BIFT to determine, for each bit position, the number of FBM entries in which the bit position is set, and determining the maximum number of FBM entries that have a given bit position set. Additional details regarding determining the maximum number of ECMP paths are discussed with regard to FIG. 12. At 908, the BFR determines whether the maximum number of ECMP paths is greater than one. If not, no further action needs to be taken with regard to generating forwarding information that is free from ECMP issues. However, if the BFR determines that multiple ECMP paths exist, the BFR generates non-ECMP forwarding information at 910. In one embodiment, this involves generating multiple forwarding tables and/or forwarding entries, which will be selected between to provide load balancing and prevent packet duplication. Additional details regarding generating non-ECMP forwarding information are discussed with regard to FIGS. 13A and 13B.

Figure 10:
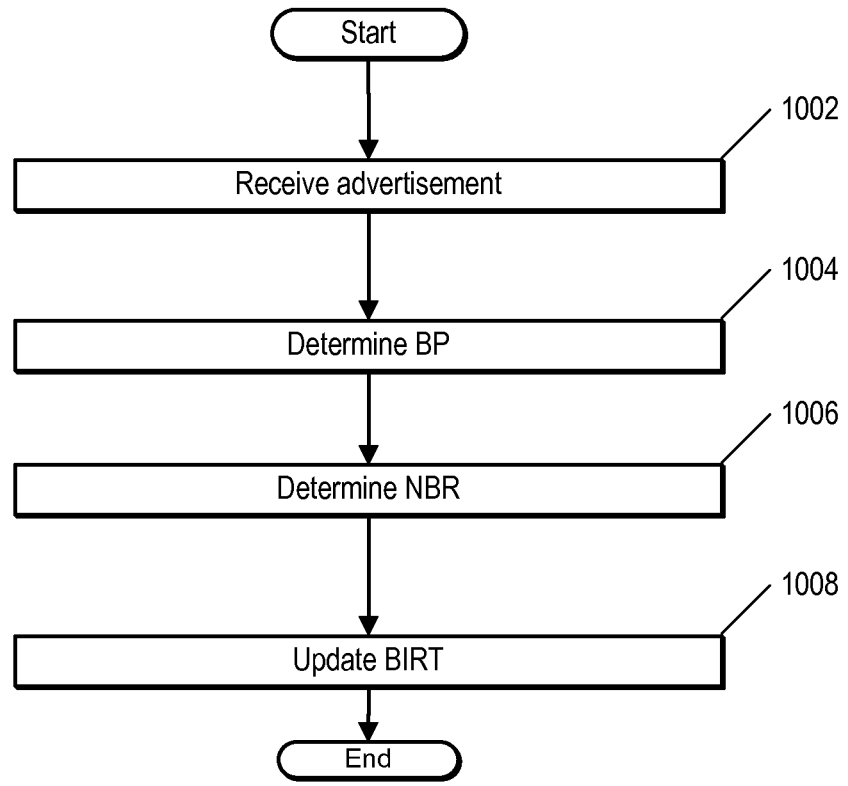
FIG. 10 is a flow chart illustrating an example process employed by a node, according to the present description.

FIG. 10 is a flow chart illustrating an example process employed by a node, according to the present description. FIG. 10 shows additional details for generating a bit indexed routing table (BIRT) as described at 902 of FIG. 9. In one embodiment, FIG. 10 is performed by a BFR, such as BFR 406 of FIG. 4.

At 1002, the BFR receives an advertisement generated by a BFER. In one embodiment, the advertisement is received via IGP and includes information identifying a mapping between a routable address associated with the BFER, such as a router identifier, and a bit position and set identifier associated with the BFER. In response to receiving the advertisement, the BFR determines, at 1004, the BP associated with the BFER that generated the advertisement. The BFR also determines the set identifier, if one is included in the advertisement.

At 1006, the BFR accesses its stored topology information to determine the next hop neighbor along the shortest path towards the BFER that generated the advertisement. At 1008, the BFR updates the BIRT. In one embodiment, this comprises adding an entry that includes information identifying the BFR ID and bit position of the BFER, as well as the neighbor via which the BFER is reachable.

Figure 11:
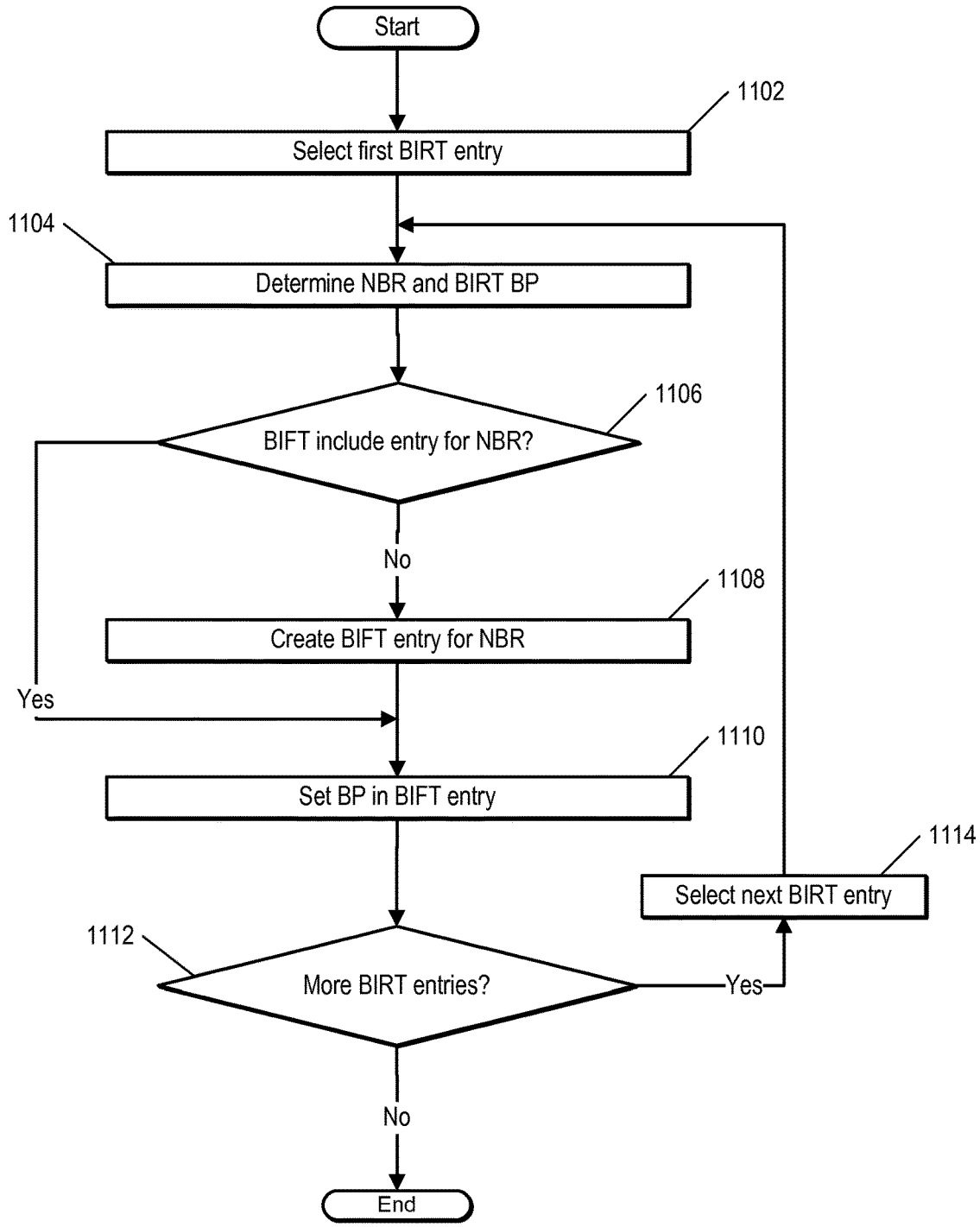
FIG. 11 is a flow chart illustrating an example process employed by a node, according to the present description.

FIG. 11 is a flow chart illustrating an example process of generating a BIFT employed by a node, according to the present description. FIG. 11 shows additional details of operation 904 of FIG. 9. In one embodiment, FIG. 11 is performed by a BFR, such as BFR 406 of FIG. 4.

At 1102, the BFR selects a first entry in the BFR's BIRT. At 1104, the BFR determines the neighbor and bit position associated with the entry. In one embodiment, the neighbor is identified by a BFR ID or prefix or other information. At 1106, the BFR determines whether the BIFT already includes an entry for the neighbor. In the case of the first BIRT entry, there will not be a BIFT entry corresponding to the neighbor identifying the BIRT entry. If there is no BIFT entry corresponding to the neighbor, the BFR creates a BIFT entry corresponding to the neighbor at 1108. At 1110, the BFR sets a bit in the FBM corresponding to the bit position identified in the BIRT entry. At 1112, the BFR determines whether the BIRT includes additional entries. If so, the BFR selects the next BIRT entry at 1114.

For example, considering BIRT 502 of FIG. 5A, at 1102, the BFR selects the first entry in the BIRT. In the example of BIRT 502, the first entry corresponds to neighbor C. Next, the BFR determines, at 1104, that the entry corresponds to BP 5. That is, node L, which has been assigned BP 5, is reachable from the BFR via node C. Next, the BFR creates an entry in its BIFT for neighbor C and sets the fifth bit in the FBM. FIG. 5B shows that the entry corresponding to neighbor C has bit 5 set. The BFR then proceeds iteratively, next selecting the entry for neighbor D corresponding to bit 5, and so on. After performing the method shown in FIG. 11, the BFR will have a BIFT that includes one entry for each of the BFR's neighbors and each entry will include a forwarding bit mask that has a bit set for each of the BFERs reachable that neighbor.

Figure 12:
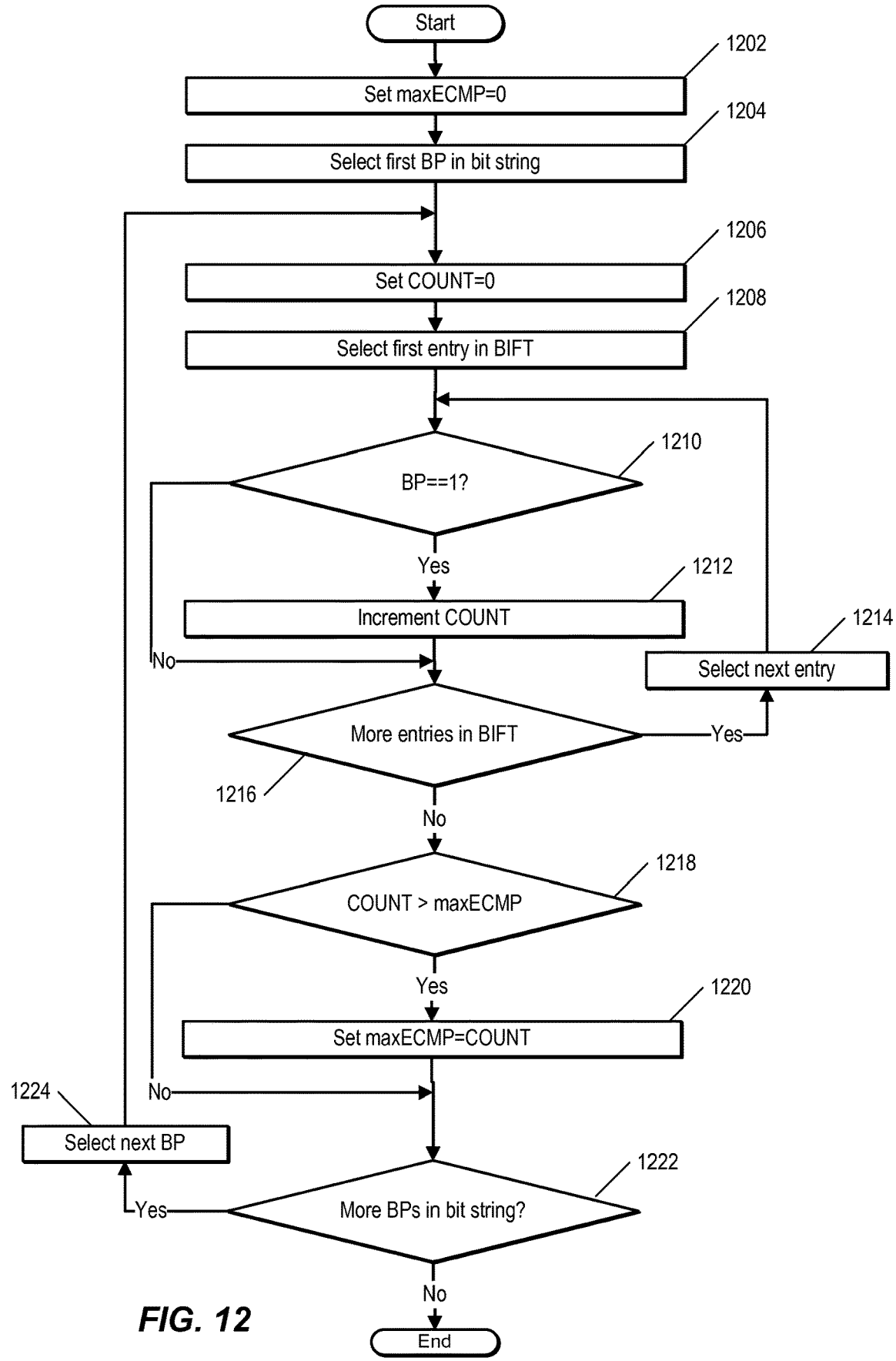
FIG. 12 is a flow chart illustrating an example process employed by a node, according to the present description.

FIG. 12 is a flow chart illustrating an example process employed by a node, according to the present description. FIG. 12 shows additional details of the method of determining the maximum number of ECMP paths present in forwarding information on a BFR, as shown at 906 of FIG. 9. In one embodiment, the method of FIG. 12 is performed by a BFR, such as BFR 406 of FIG. 4.

At 1202, a BFR initializes a variable called, for example, maxECMP. In one embodiment, initializing maxECMP involves setting maxECMP equal to zero. At 1204, the BFR selects a first bit position in a bit string. In one embodiment, the bit string corresponds to a forwarding bit mask in a bit forwarding table, as shown in FIG. 5B. In another embodiment, the bit position corresponds to the first bit in a BIER topology table that includes information indicating which bit positions are reachable via each neighbor of the BFR.

At 1206, the BFR initializes a variable called, for example, COUNT. In one embodiment, initializing COUNT involves setting COUNT equal to zero. At 1208, the BFR selects the first entry in the BIFT, or topology table. At 1210, the BFR determines whether the first bit, for example, in the FBM of the entry is set to 1. If so, the BFR increments COUNT, at 1212.

At 1216, the BFR determines whether there are more entries in the BIFT, or topology table. If so, the BFR selects the next entry at 1214 and returns to 1210, where the BFR determines whether the first bit of the FBM in the entry is set to 1. If so, the BFR increments COUNT, at 1212. In this way, the BFR determines how many entries in the BIFT have a first bit position set, and stores that value in a count variable, e.g., COUNT.

Next, at 1218, the BFR determines whether the value of COUNT is greater than that maxECMP. The first time through the method, that is, for the first bit position, if any of the bits are set, COUNT will be greater than maxECMP, since maxECMP is initially zero.

At 1220, in response to determining that COUNT is greater than maxECMP, the BFR sets maxECMP equal to the value of COUNT. At 1222, the BFR determines whether there are more bit positions in the bit string. If so, the BFR selects the next bit position in the bit string at 1224. In this example, the next bit position is bit 2. The method then returns to 1206, where COUNT is once again initialized to zero.

Then, at 1208, the BFR selects the first entry in the BIFT and determines whether bit 2 in the first entry is set to 1. The method proceeds iteratively through each bit in the bit string. Upon completion the maxECMP will be a value equal to the largest number of ECMP paths indicated by the BIFT. Using the example BIFT 504 of FIG. 5B, the largest number of EMCP paths is 4, which corresponds to bit position 1.

Figure 13A:
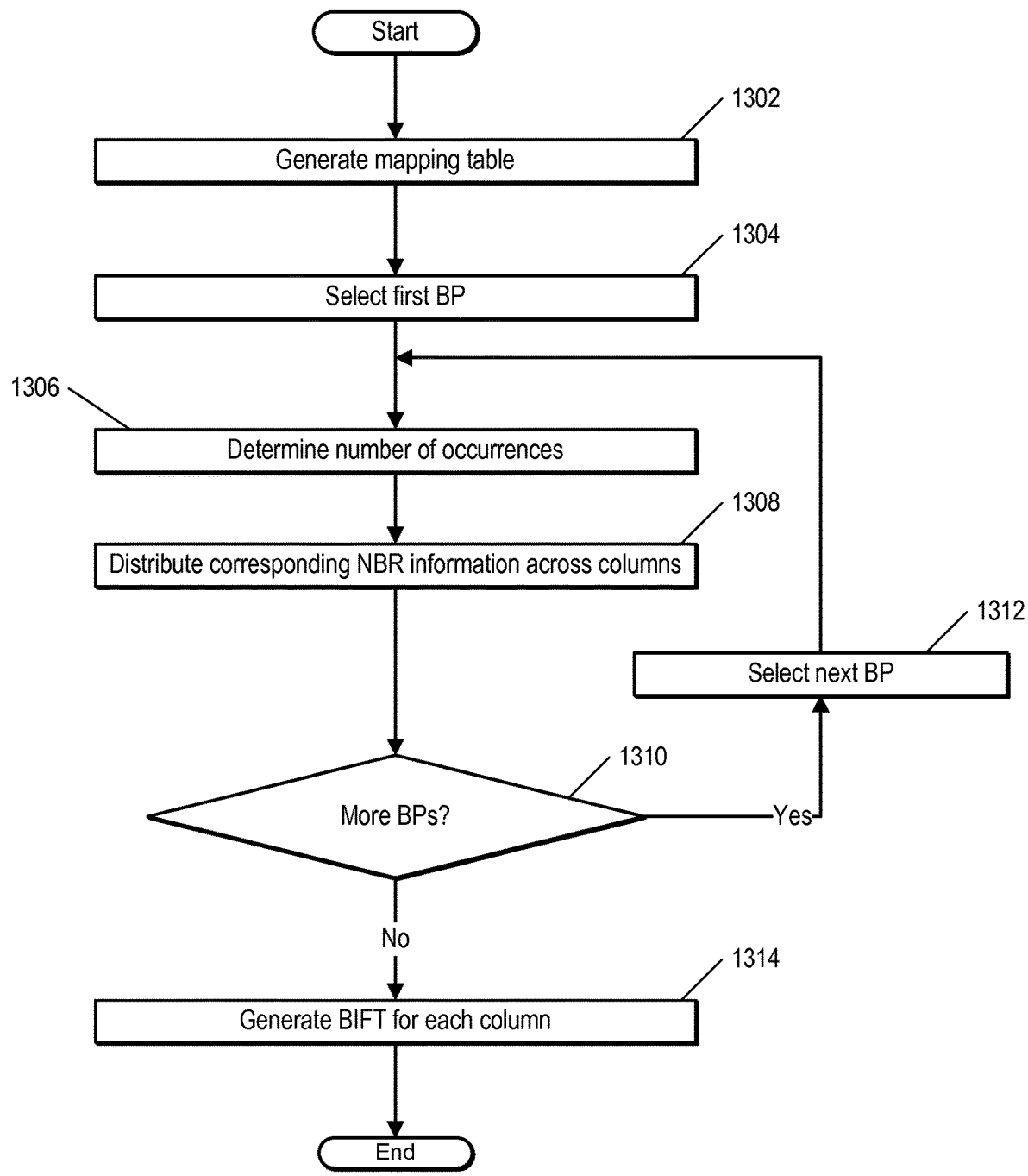
FIG. 13A is a flow chart illustrating an example process employed by a node, according to the present description.

FIG. 13A is a flow chart illustrating an example process employed by a node, according to the present description. FIG. 13A illustrates additional details of generating non-ECMP forwarding information, as shown at 910 of FIG. 9. In one embodiment, FIG. 13A is performed by a BFR, such as BFR 406 of FIG. 4. FIG. 13A illustrates one process that convert a BIFT that includes multiple ECMP paths into several BIFTs that do not include multiple ECMP paths.

At 1302, the BFR generates a mapping table, such as ECMP mapping table 602 of FIG. 6. The mapping table includes a column for each ECMP path. In one embodiment, the number of columns is equal to the value of the maxECMP, as calculated in FIG. 12. The mapping table also includes a row for each bit position in the bit string.

At 1304, the BFR selects the first bit position in an FBM included in the BFRs BIFT. At 1306, the BFR determines the number of occurrences of this bit position in the BIFT. That is, the BFR determines how many neighbor entries include FBMs in which this bit position is set to 1. In one embodiment, the BFR sets a count value to 0 and increments the count each time the BFR detects a neighbor entry in which this bit position is set to 1. In one embodiment, the count values calculated in FIG. 12 are reused.

At 1308, the BFR distributes corresponding neighbor information across the columns. If the number of occurrences of a set bit for the BP equals the number of columns in the mapping table, then each neighbor that corresponds to an occurrence, that is, a set bit, will appear once. If the number of occurrences of a set bit is less than the maximum number of columns in the mapping table, then one or more neighbors that correspond to a set bit will appear multiple times. For example, if the BFR determines that a bit position is set in two entries, and the maximum number of ECMP paths, i.e., the number of columns in the mapping table, is 4, then each of the neighbors corresponding to the entries in which the bit is set appears twice in the mapping table entry.

At 1310, the BFR determines whether there are more bit positions in the bit string or forwarding bit mask. If so, the BFR selects the next bit position at 1312. After the entire bit string has been processed, the mapping table is completely filled in.

At 1314, the BFR generates a BIFT for each column in the mapping table. In one embodiment, generating a BIFT for each column involves creating an entry corresponding to each neighbor. Each entry includes a FBM. The BFR determines, for each BP in the mapping table, in which neighbor's FBM the BP should be set. Considering the example of FIG. 6, bit positions one, two, and three are set in the FBM corresponding to neighbor A in the first BIFT, as shown at FIG. 7A. For the BIFT shown in FIG. 7B, the bit positions are set in FBMs corresponding to different neighbors.

Figure 13B:
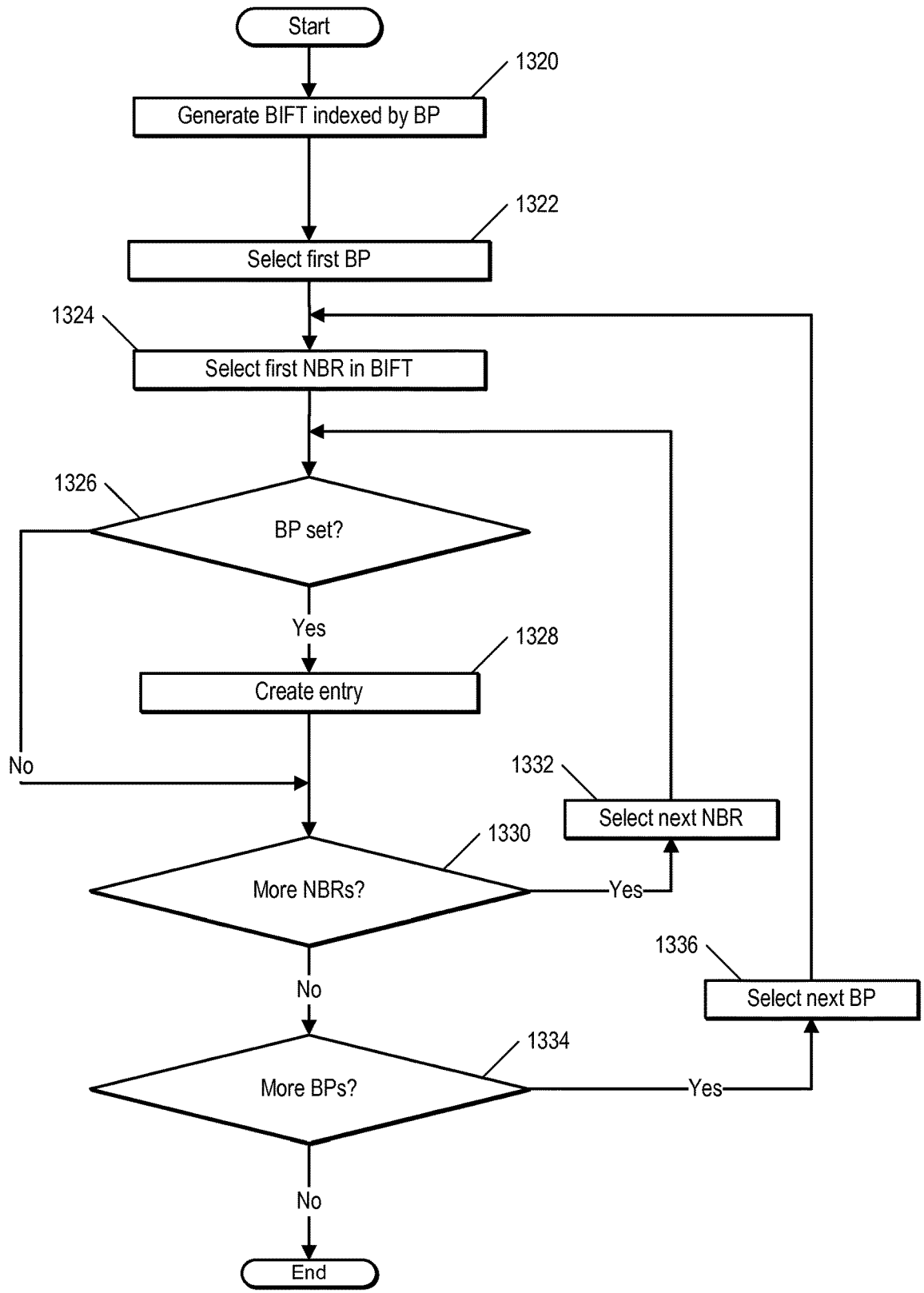
FIG. 13B is a flow chart illustrating an example process employed by a node, according to the present description.

FIG. 13B is a flow chart illustrating an example process employed by a node, according to the present description. FIG. 13B shows another method of generating non-ECMP forwarding information, as shown at 910 of FIG. 9. In one embodiment, the method is performed by a BFR, such as BFR 406 of FIG. 4.

At 1320, the BFR generates an optimized BIFT that is indexed by bit position. In one embodiment, this uses a BIFT, such as BIFT 504 of FIG. 5B. The BFR determines the length of FBM used in the BIFT and creates an entry in the optimized BIFT for each BP. At 1322, the BFR selects the first bit position. At 1324, the BFR selects the first neighbor in the BIFT. In the example of BIFT 504, the BFR selects neighbor A. At 1326, the BFR determines whether the bit corresponding to the bit position is set. If so, at 1328 the BFR creates an entry corresponding to the bit position. In one embodiment, the entry includes the forwarding bit mask from the BIFT and information identifying the neighbor. In the example of BIFT 504, the first bit is set, so the BFR creates an entry in the optimized BIFT for BP 1 that includes neighbor A and neighbor A's FBM {00111}.

At 1330, the BFR determines whether there are more neighbors in the BIFT. If so, the BFR selects the next neighbor at 1332 and determines at 1326 if the bit corresponding to the bit position is set. If so, the BFR creates another entry corresponding to the bit position that includes the FBM and neighbor from the BIFT. In the example of BIFT 504, the first BP is also set for neighbor B, so the BFR creates an entry in the optimized BIFT for BP 1 that includes information identifying neighbor B and neighbor B's FBM {01101}.

After traversing all of the neighbors in the BIFT, the BFR determines, at 1334, whether there are more bit positions. If so, the BFR selects the next bit position at 1336, and returns to 1324. After traversing each bit position in the bit string, the BFR has generated an optimized BIFT sorted by bit position that includes entries for each ECMP path, such as BIFT 802 of FIG. 8.

Figure 14:
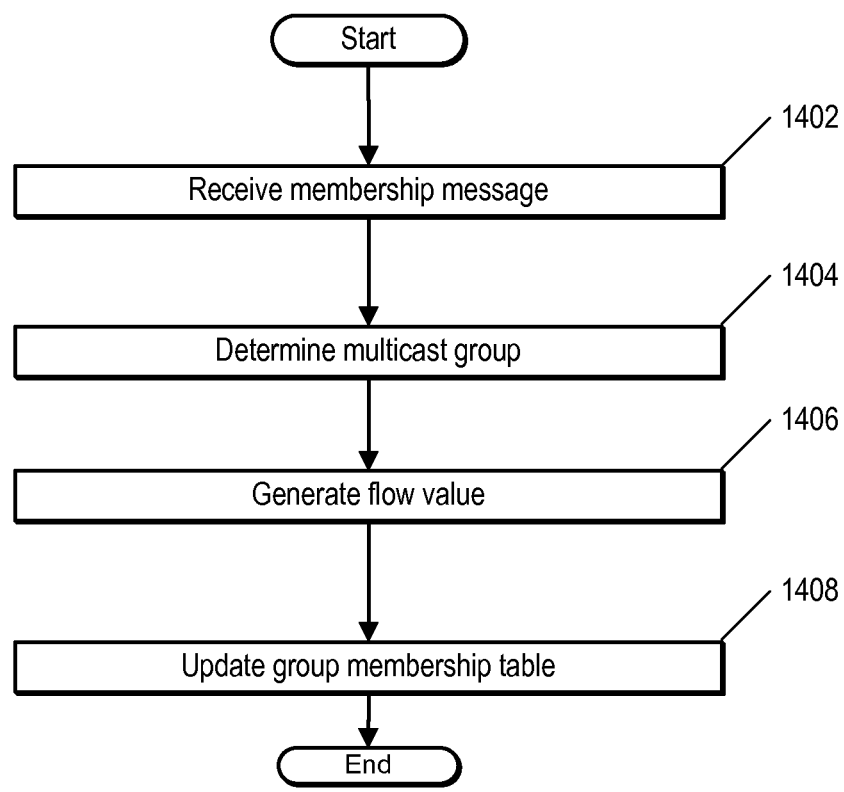
FIG. 14 is a flow chart illustrating an example process employed by a node, according to the present description.

FIG. 14 is a flow chart illustrating an example process employed by a node, according to the present description. A BFR, such as BFR 406 of FIG. 4, that has non-ECMP forwarding information, such as a forwarding table for each ECMP path, selects one set of forwarding information (e.g., BIFT or BIFT entry) in response to receiving a multicast data packet. In one embodiment, the selection involves using a flow value included in the multicast data packet. FIG. 14 illustrates a method for generating the flow value.

At 1402, a BFIR receives a membership message. In one embodiment, the membership message is a BGP message. At 1404, the BFIR identifies a multicast group identified by the membership message. In one embodiment, this involves parsing the membership message, identifying a multicast group address field, and extracting the multicast group address.

At 1406, the BFIR generates a flow value. In one embodiment, generating a flow value involves creating a hash of the multicast source and/or group address or identifier. In an alternate embodiment, the flow value can be implemented as a numerical value. For example, the BFIR can assign each multicast group for which the BFIR receives a membership message a number. The BFIR can advertise, e.g., using overlay signaling, such as BGP, the flow value assigned to a multicast group, so that the same flow value is used by each BFIR. Alternatively, each BFIR can use a different flow for the same multicast group. In one embodiment, the flow value is calculated by transit nodes in response to the transit nodes receiving the multicast data packet. The transit nodes can calculate a hash value using the multicast source and/or group address, or can add additional information to the hash, e.g., information identifying a port on a transit node.

At 1408, the BFIR updates the group membership table. In one embodiment, updating the group membership table involves the BFIR storing the flow value in an entry that corresponds to the multicast group membership information. In one embodiment, updating the group membership table also involves the BFIR setting the bit corresponding to the BFER's BP in the bit string that corresponds to the multicast group. The membership message includes, in one embodiment, the BFER's BP. Alternatively, the BFIR performs a lookup to determine the BP associated with the BFER that originated the membership message using the address of the BFER that originated the membership message and the information advertised via IGP, e.g., information in the BFIR's BIRT.

Figure 15:
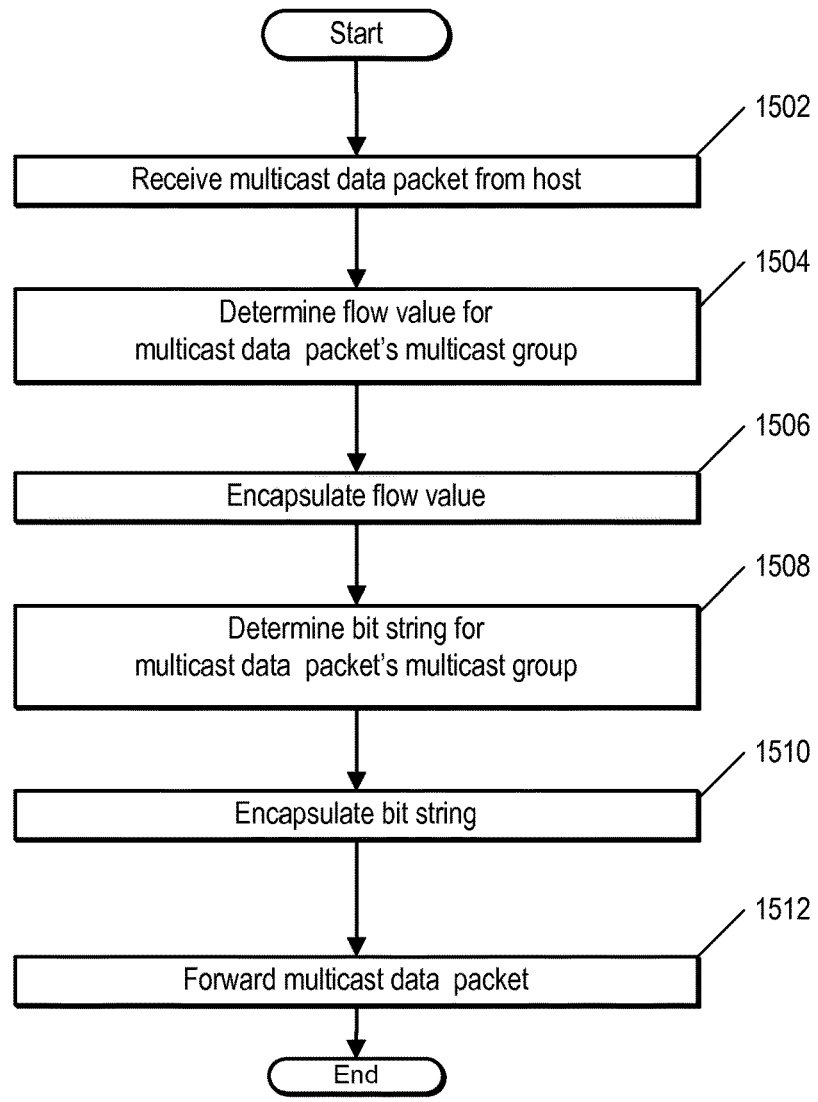
FIG. 15 is a flow chart illustrating an example process employed by a node, according to the present description.

FIG. 15 is a flow chart illustrating an example process employed by a node, according to the present description. FIG. 15 illustrates a method performed by a BFIR. At 1502, the BFIR receives a multicast data packet, for example, from a host. At 1504, the BFIR determines the flow value for the multicast data packet's multicast group. In one embodiment, the multicast data packet includes information identifying the multicast group. The BFIR uses that information to lookup the flow value in the BFIR's GMT.

At 1506, the BFIR encapsulates the flow value into the multicast data packet, for example, in a BIER header. In one embodiment, the BFIR includes the flow value in the entropy field of the packet header. The entropy field is typically an 8-bit field. An advantage is that the entropy field is typically located towards the front of a header, so BFRs can quickly identify the flow value without having to parse the bulk of an incoming multicast data packet.

At 1508, the BFIR determines a bit string for the multicast data packet's multicast group. In one embodiment, this bit string is included in the BFIR's GMT. At 1510, the BFIR encapsulates the bit string into the multicast data packet, for example, into a BIER header. The BFIR can be configured, e.g., by a network administrator, to use one of several different encapsulation methods for the bit string. This depends on the network configuration and can be, for example, IP, MPLS, or some other encapsulation protocol.

At 1512, the BFIR forwards the multicast data packet. In one embodiment, this involves comparing the bit string with the BFIRs BIFT. Forwarding the multicast data packet involves, in one embodiment, accessing a BIFT maintained by the IR, and determining, based on the bit string, which neighbors to send the multicast data packet to. In one embodiment, the BFIR performs a logical AND operation between the bit string in the multicast data packet and entries in its BIFT and forwards the packet to those neighbors for which the result of the AND is true.

Figure 16A:
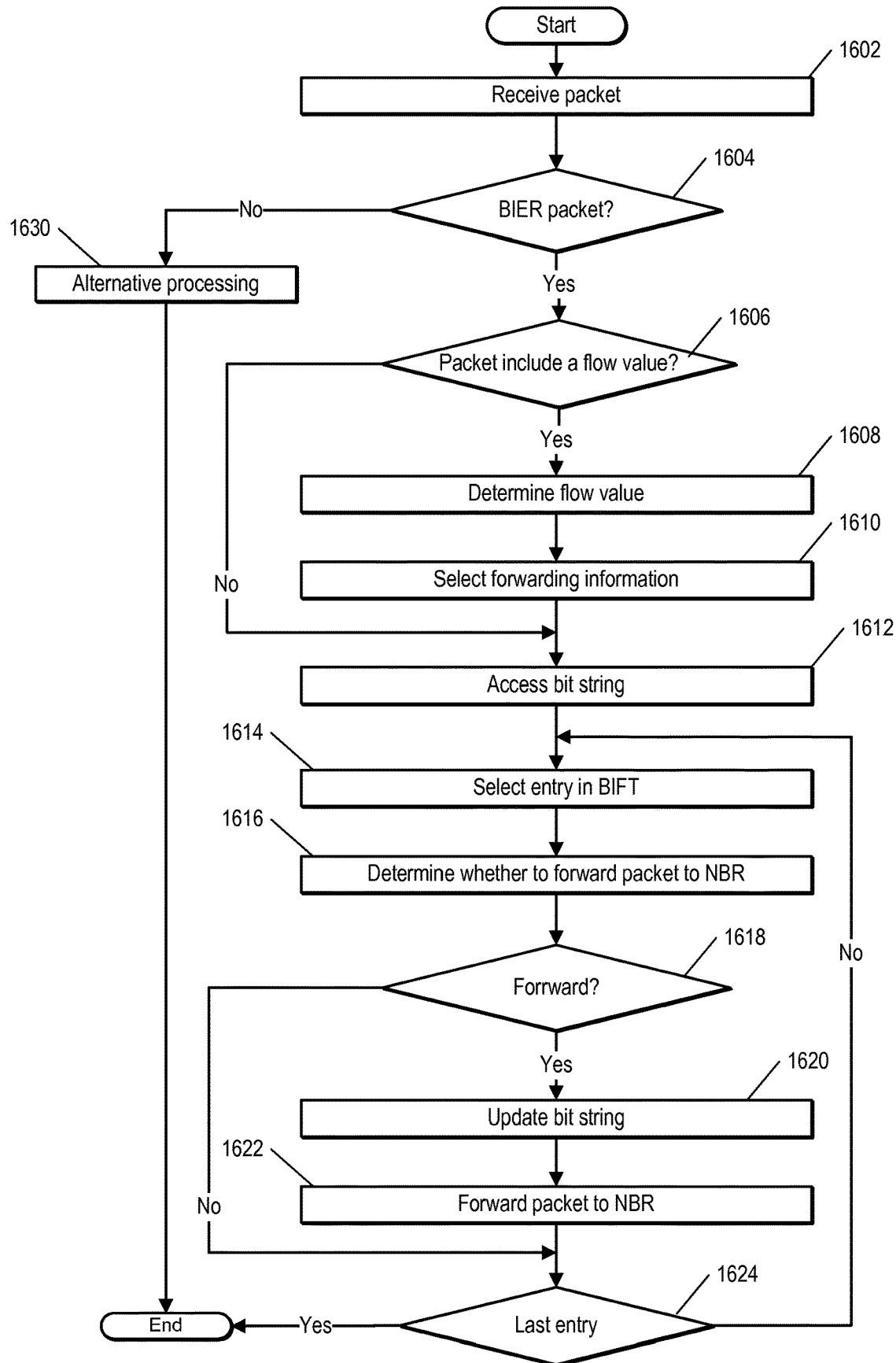
FIG. 16A is a flow chart illustrating an example process employed by a node, according to the present description.

FIG. 16A is a flow chart illustrating an example process of forwarding a multicast data packet employed by a node, according to the present description. In one embodiment, the process is performed by a BFR, such as BFR 406 of FIG. 4. The process of FIG. 16A involves using a BIFT, such as BIFT 504 of FIG. 5B.

At 1602, the BFR receives a multicast data packet. The BFR determines, at 1604, whether the multicast data packet is a BIER packet, and therefore includes a bit string. In one embodiment, the BFR scans the header of the multicast data packet for a value that indicates that the multicast data packet is a BIER packet. The BFR can detect that the sender of the multicast data packet was a BFR and therefore conclude that the multicast data packet is a BIER multicast data packet. If the multicast data packet is not a BIER multicast data packet, the BFR performs alternate processing at 1630. In one embodiment, alternate processing 1630 involves flooding the multicast data packet to all interfaces on the BFR, or dropping the multicast data packet. Alternatively, if traditional multicast forwarding information is available, the BFR can use that information to forward the packet.

At 1606, the BFR determines whether the multicast data packet includes a flow value. In one embodiment, this involves the BFR parsing the multicast data packet header and determining whether the header includes an entropy field. If so, a value in the entropy field can be a flow value, or can be one of a set of values that indicates that no flow value is present in the multicast data packet.

In response to detecting that the multicast data packet includes a flow value, the BFR determines the value of the flow value at 1608. In one embodiment, the flow value is an encoded value that the BFR translates to determine the actual flow value. Using the flow value, the BFR selects, at 1610, forwarding information to forward the multicast data packet. For example, the BFR maintains, in one embodiment, a translation table that associates flow values with corresponding BIFTs. Based on the flow value received in the multicast data packet, the BFR selects one of the BIFTs to use in forwarding the multicast data packet.

The BFR accesses the bit string at 1621. In one embodiment, accessing the bit string involves identifying an encapsulation protocol, and locating the bit string in the multicast data packet based on the encapsulation protocol type. At 1614, the BFR selects an entry in the BFR's BIFT. In one example, the first entry in the BIFT is selected and the BFR performs an in-order traversal of the BIFT.

The BIFT determines, at 1616, whether to forward the multicast data packet to the neighbor associated with the selected BIFT entry. In one embodiment, this involves performing an AND operation between the bit string in the multicast data packet and the FBM in the selected BIFT entry. If the result of the AND operation is true, as determined at 1618, the method proceeds to 1620, and the BFR updates the bit string in the multicast data packet. In one embodiment, this involves performing an AND operation between the bit string in the multicast data packet and the bit string in the selected BIFT entry and writing the results of the AND operation into the bit string in the multicast data packet. This has the effect of clearing bits in bit positions which are not reachable via the neighbor to which the multicast data packet is being forwarded. Doing so prevents duplication or looping problems.

At 1622, the BFR forwards the multicast data packet to the neighbor corresponding to the BIFT entry. At 1624, the BFR determines whether additional entries remain in the BIFT, if so, the method returns to 1614, and the next entry in the BIFT is selected.

Figure 16B:
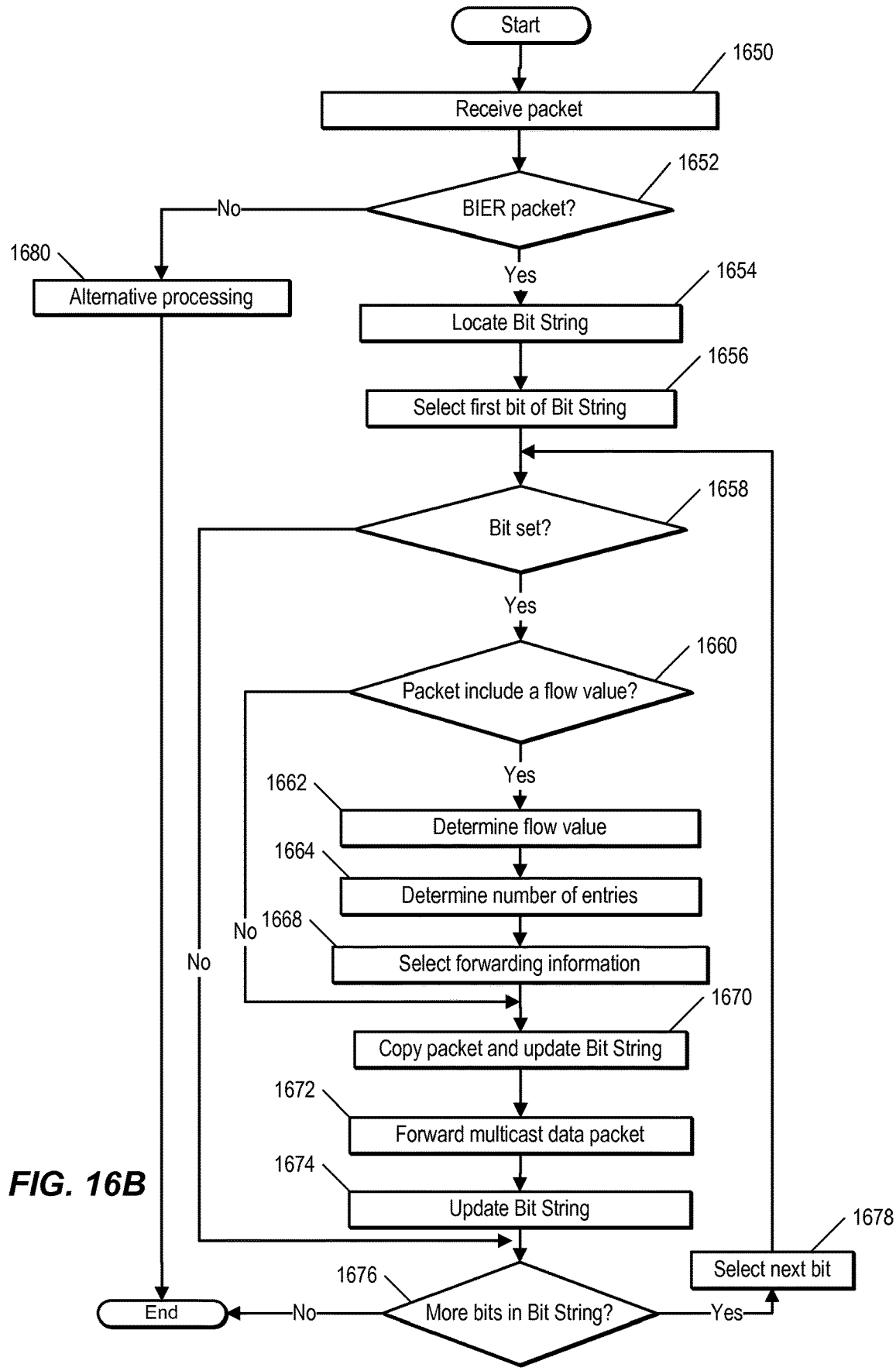
FIG. 16B is a flow chart illustrating an example process employed by a node, according to the present description.

FIG. 16B is a flow chart illustrating an example process of forwarding a multicast data packet employed by a node, according to the present description. In one embodiment, the process is performed by a BFR, such as BFR 406 of FIG. 4. The process of FIG. 16B involves using an optimized BIFT, such as optimized BIFT 802 of FIG. 8.

At 1650, the BFR receives a multicast data packet. The BFR determines, at 1652, whether the multicast data packet is a BIER packet, and therefore includes a bit string. In one embodiment, the BFR scans the header of the multicast data packet for a value that indicates that the multicast data packet is a BIER packet. The BFR can detect that the sender of the multicast data packet was a BFR and therefore conclude that the multicast data packet is a BIER multicast data packet. If the multicast data packet is not a BIER multicast data packet, the BFR performs alternate processing at 1680. In one embodiment, alternate processing 1680 involves flooding the multicast data packet to all interfaces on the BFR, or dropping the multicast data packet. Alternatively, if traditional multicast forwarding information is available, the BFR can use that information to forward the packet.

If the multicast data packet is a BIER multicast data packet, the BFR knows that the multicast data packet includes a bit string. The BFR locates the bit string in the multicast data packet at 1654. Using the bit string, the BFR determines which neighbors the multicast data packet should be forwarded to. In one embodiment, this involves selecting, as shown at 1656, the first bit of the bit string and determining, as shown at 1658, whether the first bit of the bit string is set. If the bit is not set, the BFR determines, at 1676, whether more bits are present in the bit string. If so, the BFR selects the next bit at 1678 and the method returns to 1658.

In response to determining that a bit in the bit string is set, the BFR determines, at 1660, whether the multicast data packet includes a flow value. In one embodiment, this involves the BFR parsing the multicast data packet header and determining whether the header includes an entropy field. If so, a value in the entropy field can be a flow value, or can be one of a set of values that indicates that no flow value is present in the multicast data packet.

In response to detecting that the multicast data packet includes a flow value, the BFR determines the value of the flow value at 1662. In one embodiment, the flow value is an encoded value that the BFR translates to determine the actual flow value. At 1664, the BFR determines the number of entries that correspond to the selected bit position in the optimized BIFT. Using the flow value, the BFR selects, at 1664, a forwarding entry with which to forward the multicast data packet. In one embodiment, using the flow value to select forwarding information involves determining the number of available sets of forwarding information (e.g., BIFT entries) and/or the number of ECMP paths associated with a given bit position. Based on the number of ECMP paths, and the maximum number of ECMP paths, the flow value can be modified, e.g., divided by an appropriate value. For example, if the flow value provides a selector for four ECMP paths, but a given bit position only has two entries, the flow value can be bit shifted right (divided by two) to provide a commensurate number of possible selections.

At 1670, the BFR creates a copy of the multicast data packet and updates the bit string. Updating the bit string in the copy of the packet involves clearing bits in the bit string that correspond to neighbors that are not reachable via a shortest path from the interface to which the copy of the packet is being forwarded. This can be accomplished by performing an AND operation between the bit string from the incoming multicast data packet and the bit mask in the forwarding table entry that corresponds to the selected bit. The resulting value is used as the bit string for the copy of the multicast data packet. At 1672, the BFR forwards the multicast packet to the interface.

At 1674, the BFR updates the bit string that arrived in the multicast data packet by clearing those bits in the multicast data packet's bit string that correspond to the bits which were set in the multicast data packet that the BFR forwarded. In one embodiment, this involves performing an AND operation between the bit string in the received multicast data packet, and the inverse of the bit mask in the entry corresponding to the selected bit. This has the effect of clearing those bits that correspond to bit positions which were set in the bit string of the outgoing packet, which prevents looping and duplication. The BFR then determines, at 1676, whether more bits are present in the bit string. The BFR then continues to walk to the bit string of the received multicast data packet, bit-by-bit, until the end of the bit mask is reached.

Figure 17:
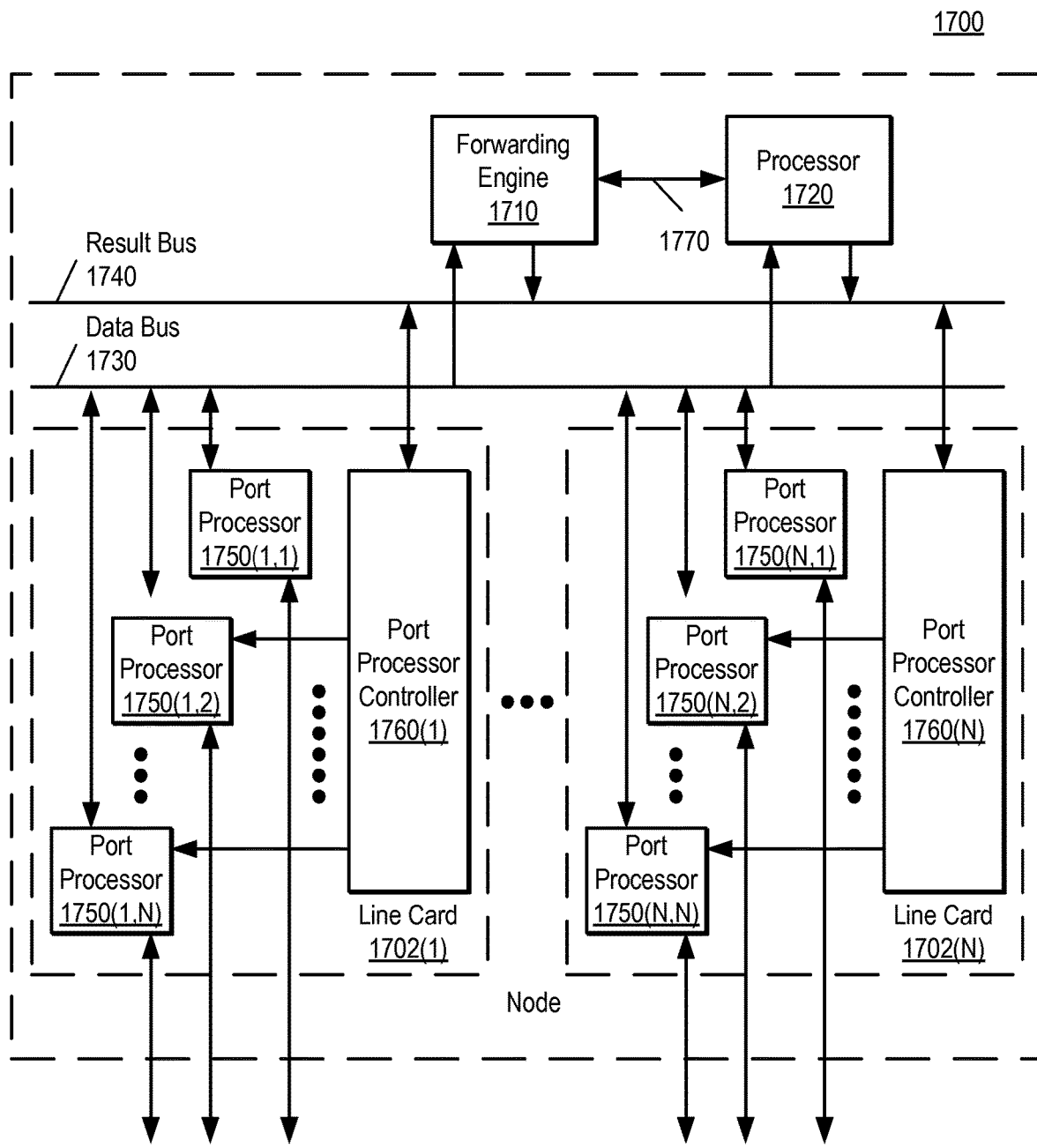
FIG. 17 is a block diagram illustrating certain components of an example node that can be employed, according to the present description.

FIG. 17 is a block diagram illustrating certain additional and/or alternative components of nodes that can be employed, for example in the network shown in FIG. 3. In this depiction, node 1700 includes a number of line cards (line cards 1702(1)-(N)) that are communicatively coupled to a forwarding engine or packet forwarder 1710 and a processor 1720 via a data bus 1730 and a result bus 1740. Line cards 1702(1)-(N) include a number of port processors 1750(1,1)-(N,N) which are controlled by port processor controllers 1760(1)-(N). It will also be noted that forwarding engine 1710 and processor 1720 are not only coupled to one another via data bus 1730 and result bus 1740, but are also communicatively coupled to one another by a communications link 1770.

The processors 1750 and 1760 of each line card 1702 may be mounted on a single printed circuit board. When a packet or packet and header are received, the packet or packet and header may be identified and analyzed by router 1700 in the following manner. Upon receipt, a packet (or some or all of its control information) or packet and header is sent from the one of port processors 1750(1,1)-(N,N) at which the packet or packet and header was received to one or more of those devices coupled to data bus 1730 (e.g., others of port processors 1750(1,1)-(N,N), forwarding engine 1710 and/or processor 1720). Handling of the packet or packet and header can be determined, for example, by forwarding engine 1710. For example, forwarding engine 1710 may determine that the packet or packet and header should be forwarded to one or more of port processors 1750(1,1)-(N, N). This can be accomplished by indicating to corresponding one(s) of port processor controllers 1760(1)-(N) that the copy of the packet or packet and header held in the given one(s) of port processors 1750(1,1)-(N,N) should be forwarded to the appropriate one of port processors 1750(1,1)-(N,N). In addition, or alternatively, once a packet or packet and header has been identified for processing, forwarding engine 1710, processor 1720 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 18:
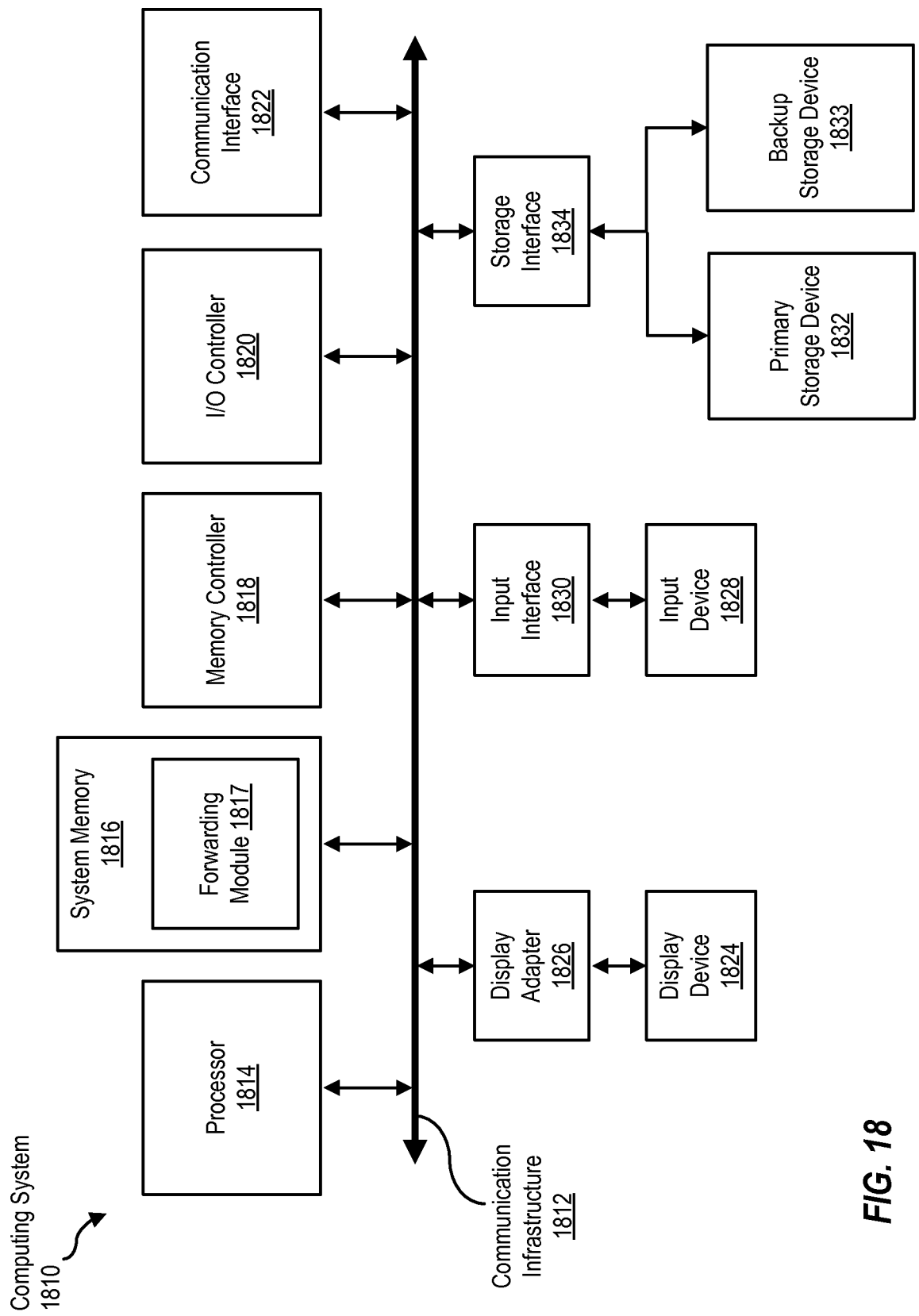
FIG. 18 is a block diagram depicting a computer system suitable for implementing embodiments of the systems described herein.

FIG. 18 is a block diagram of a computing device, illustrating how a forwarding module can be implemented in software, as described above. Computing system 1810 broadly represents any single or multi-processor computing device or system capable of executing computer-readable instructions. Examples of computing system 1810 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1810 may include at least one processor 1818 and a system memory 1816. By executing the software that implements a forwarding module 1817, computing system 1810 becomes a special purpose computing device that is configured to perform packet forwarding, in the manner described above.

Processor 1818 generally represents any type or form of processing unit capable of processing data or interpreting and executing instructions. In certain embodiments, processor 1818 may receive instructions from a software application or module. These instructions may cause processor 1818 to perform the functions of one or more of the embodiments described and/or illustrated herein. For example, processor 1818 may perform and/or be a means for performing the operations described herein. Processor 1818 may also perform and/or be a means for performing any other operations, methods, or processes described and/or illustrated herein.

System memory 1816 generally represents any type or form of volatile or non-volatile storage device or medium capable of storing data and/or other computer-readable instructions. Examples of system memory 1816 include, without limitation, random access memory (RAM), read only memory (ROM), flash memory, or any other suitable memory device. Although not required, in certain embodiments computing system 1810 may include both a volatile memory unit (such as, for example, system memory 1816) and a non-volatile storage device (such as, for example, primary storage device 1832, as described in detail below). In one example, program instructions executable to implement a forwarding module configured to forward multicast data packets may be loaded into system memory 1816.

In certain embodiments, computing system 1810 may also include one or more components or elements in addition to processor 1818 and system memory 1816. For example, as illustrated in FIG. 18, computing system 1810 may include a memory controller 1818, an Input/Output (I/O) controller 1820, and a communication interface 1822, each of which may be interconnected via a communication infrastructure 1812. Communication infrastructure 1812 generally represents any type or form of infrastructure capable of facilitating communication between one or more components of a computing device. Examples of communication infrastructure 1812 include, without limitation, a communication bus (such as an Industry Standard Architecture (ISA), Peripheral Component Interconnect (PCI), PCI express (PCIe), or similar bus) and a network.

Memory controller 1818 generally represents any type or form of device capable of handling memory or data or controlling communication between one or more components of computing system 1810. For example, in certain embodiments memory controller 1818 may control communication between processor 1818, system memory 1816, and I/O controller 1820 via communication infrastructure 1812. In certain embodiments, memory controller 1818 may perform and/or be a means for performing, either alone or in combination with other elements, one or more of the operations or features described and/or illustrated herein.

I/O controller 1820 generally represents any type or form of module capable of coordinating and/or controlling the input and output functions of a computing device. For example, in certain embodiments I/O controller 1820 may control or facilitate transfer of data between one or more elements of computing system 1810, such as processor 1818, system memory 1816, communication interface 1822, display adapter 1826, input interface 1830, and storage interface 1834.

Communication interface 1822 broadly represents any type or form of communication device or adapter capable of facilitating communication between computing system 1810 and one or more additional devices. For example, in certain embodiments communication interface 1822 may facilitate communication between computing system 1810 and a private or public network including additional computing systems. Examples of communication interface 1822 include, without limitation, a wired network interface (such as a network interface card), a wireless network interface (such as a wireless network interface card), a modem, and any other suitable interface. In at least one embodiment, communication interface 1822 may provide a direct connection to a remote server via a direct link to a network, such as the Internet. Communication interface 1822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1822 may also represent a host adapter configured to facilitate communication between computing system 1810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1822 may also allow computing system 1810 to engage in distributed or remote computing. For example, communication interface 1822 may receive instructions from a remote device or send instructions to a remote device for execution.

As illustrated in FIG. 18, computing system 1810 may also include at least one display device 1824 coupled to communication infrastructure 1812 via a display adapter 1826. Display device 1824 generally represents any type or form of device capable of visually displaying information forwarded by display adapter 1826. Similarly, display adapter 1826 generally represents any type or form of device configured to forward graphics, text, and other data from communication infrastructure 1812 (or from a frame buffer) for display on display device 1824.

As illustrated in FIG. 18, computing system 1810 may also include at least one input device 1828 coupled to communication infrastructure 1812 via an input interface 1830. Input device 1828 generally represents any type or form of input device capable of providing input, either computer or human generated, to computing system 1810. Examples of input device 1828 include, without limitation, a keyboard, a pointing device, a speech recognition device, or any other input device.

As illustrated in FIG. 18, computing system 1810 may also include a primary storage device 1832 and a backup storage device 1833 coupled to communication infrastructure 1812 via a storage interface 1834. Storage devices 1832 and 1833 generally represent any type or form of storage device or medium capable of storing data and/or other computer-readable instructions. For example, storage devices 1832 and 1833 may be a magnetic disk drive (e.g., a so-called hard drive), a floppy disk drive, a magnetic tape drive, an optical disk drive, a flash drive, or the like. Storage interface 1834 generally represents any type or form of interface or device for transferring data between storage devices 1832 and 1833 and other components of computing system 1810. A storage device like primary storage device 1832 can store information such as routing tables and forwarding tables.

In certain embodiments, storage devices 1832 and 1833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1832 and 1833 may also include other similar structures or devices for allowing computer software, data, or other computer-readable instructions to be loaded into computing system 1810. For example, storage devices 1832 and 1833 may be configured to read and write software, data, or other computer-readable information. Storage devices 1832 and 1833 may also be a part of computing system 1810 or may be a separate device accessed through other interface systems.

Many other devices or subsystems may be connected to computing system 1810. Conversely, all of the components and devices illustrated in FIG. 18 need not be present to practice the embodiments described and/or illustrated herein. The devices and subsystems referenced above may also be interconnected in different ways from that shown in FIG. 18.

Computing system 1810 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1810 for storage in memory via a network such as the Internet or upon a carrier medium.

The computer-readable medium containing the computer program may be loaded into computing system 1810. All or a portion of the computer program stored on the computer-readable medium may then be stored in system memory 1816 and/or various portions of storage devices 1832 and 1833. When executed by processor 1818, a computer program loaded into computing system 1810 may cause processor 1818 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1810 may be configured as an application specific integrated circuit (ASIC) adapted to implement one or more of the embodiments disclosed herein.

Figure 19:
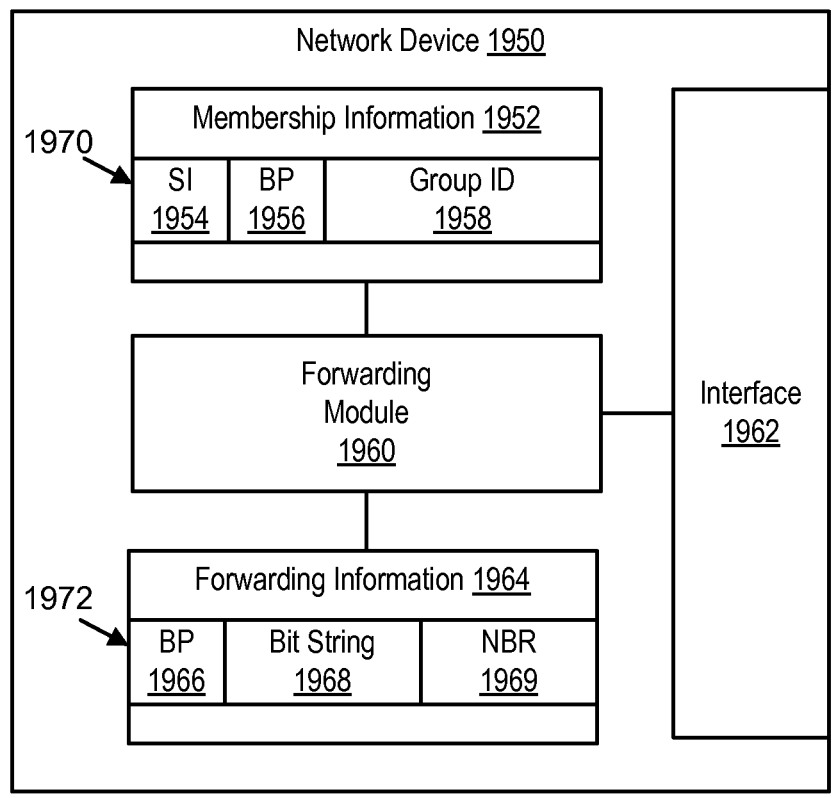
FIG. 19 is a block diagram depicting a network device suitable for implementing embodiments of the systems described herein.

FIG. 19 is a block diagram of an exemplary network device that may be associated with a node in network 200 of FIG. 2. Network device 1950 of FIG. 19 may, for example, be associated with BIER-enabled node 206 in FIG. 2. In some cases "node" as used herein encompasses one or more network devices associated with the node. "Network devices" as used herein includes various devices, such as routers, switches, or network controllers that perform routing and/or forwarding functions and support one or more routing and/or switching protocols. A network device maintains one or more routing and/or forwarding tables that store routing and/or forwarding information identifying paths to various data sources and/or data consumers. In, for example, a multicast-enabled node, a network device implements a multicast routing protocol that is used to convey multicast data packets from a multicast source to a multicast receiver.

In the embodiment of FIG. 19, network device 1950 includes storage for membership information 1952, storage for forwarding information 1964, a forwarding module 1960, and an interface 1962. Interface 1962 is coupled to send and receive packets and/or other network messages. It is noted that network device 1950 may include additional interfaces, and that each interface can be a logical or physical interface. In one embodiment, interface 1962 includes one or more ports.

Forwarding module 1960 is configured to perform forwarding based on the stored forwarding information 1964. Forwarding module 1960 is also configured to update the stored membership information 1952 and forwarding information 1964. Forwarding module 1960 can implement one or more instances of a layer 3 protocol and/or a layer 2 protocol.

Entry 1970 provides an example of membership information stored in memory of a network device. As shown, entry 1970 includes a set identifier 1954, information 1956 identifying a bit position (BP), and information 1958 identifying a multicast group. The SI and BP identify a node with which entry 1970 is associated, and the multicast group information identifies a multicast group to which the corresponding node is subscribed. The storage for membership information 1952 is, in one embodiment, implemented as a group membership table.

Entry 1972 provides an example of forwarding information that can be stored in memory of a network device. As shown, entry 1972 includes information 1966 identifying a BP, a bit string or bit array 1968, and information 1969 identifying a neighbor. Forwarding module 1960 uses the information in entry 1972 to forward multicast data packets to the interface associated with the neighbor identified in the entry. The storage for forwarding information 1964 is, in one embodiment, implemented as a bit indexed forwarding table (BIFT).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a packet at a node, wherein the packet comprises a bit string of N bits and a flow value, wherein each bit position of the bit string corresponds to a respective egress node of a network of nodes, wherein N is an integer greater than one;
selecting a first equal cost multi path (ECMP) set of bit masks from a plurality of ECMP sets of bit masks that are concurrently stored in memory of the node, wherein each ECMP set of the plurality can be used to forward a packet to one of the egress nodes through a respective neighbor node, wherein each of the ECMP sets comprises M bit masks, wherein M is an integer greater than one, wherein each of the bit masks in each of the ECMP sets comprises N bits, wherein the selecting is based on the flow value, wherein M and N are different integers;
selecting a first bit mask from the first ECMP set;
modifying the packet or a first copy of the packet to create a first modified packet, wherein modifying the packet or the first copy of the packet comprises modifying the bit string of the packet or the first copy of the packet based on the first bit mask;
forwarding the first modified packet to a first neighbor node;
selecting a second bit mask from the first ECMP set;
modifying the packet or a second copy of the packet to create a second modified packet, wherein modifying the packet or the second copy of the packet comprises modifying the bit string of the packet or the second copy of the packet based on the second bit mask;
forwarding the second modified packet to a second neighbor node;
receiving, at the node, an advertisement sent by an egress node of the network, wherein the advertisement comprises an identifier of the egress node and a bit mask bit position assigned to the egress node; and
generating or updating a bit routing table at the node, wherein the generating or updating comprises using information from the advertisement to create an entry of the bit routing table, the entry comprising the identifier of the egress node, the bit mask bit position assigned to the egress node, and an identifier of an egress interface or neighbor node via which the egress node is reachable from the node.

2. The method of claim 1, further comprising:
determining a number of ECMP paths identified in a single set of bit masks.

3. The method of claim 2, further comprising:
generating the plurality of ECMP sets of bit masks, wherein the generating comprises converting the single set of bit masks into the plurality of ECMP sets of bit masks.

4. The method of claim 1, wherein the flow value was generated as a hash of a multicast address of the packet.

5. The method of claim 1, further comprising:
generating the first bit mask using the bit routing table.

6. The method of claim 1, wherein:
modifying the bit string of the packet or the first copy of the packet comprises logically bitwise ANDing the bit string of the packet or the first copy of the packet with the first bit mask; and
modifying the bit string of the packet or a second copy of the packet comprises logically bitwise ANDing the bit string of the packet or a second copy of the packet with the second bit mask.

7. A node comprising:
a memory for storing a plurality of sets of bit masks, wherein each set of the plurality can be used to forward a packet through a respective neighbor node towards one of a plurality of egress nodes, wherein each of the sets comprises M bit masks, wherein M is an integer greater than one, wherein each of the bit masks in each of the sets comprises N bits, wherein N is an integer greater than one, and wherein N and M are different;
a network interface configured to receive a packet, wherein the packet comprises a bit string of N bits and a flow value, wherein each bit position of the bit string corresponds to a respective egress node; and
a processor configured for:
selecting a first set of bit masks from the plurality of sets of bit masks, wherein the selecting is based on the flow value;
selecting a first bit mask from the first set;
modifying the packet or a first copy of the packet to create a first modified packet, wherein modifying the packet or the first copy of the packet comprises modifying the bit string of the packet or the first copy of the packet based on the first bit mask;
selecting a second bit mask from the first set;
modifying the packet or a second copy of the packet to create a second modified packet, wherein modifying the packet or the second copy of the packet comprises modifying the bit string of the packet or the second copy of the packet based on the second bit mask;
forwarding the first modified packet to a first neighbor node;
forwarding the second modified packet to a second neighbor node;
receiving an advertisement sent by an egress node, wherein the advertisement comprises an identifier of the egress node and a bit mask bit position assigned to the egress node; and
generating or updating a bit routing table, wherein the generating or updating comprises using information from the advertisement to create an entry of the bit routing table, the entry comprising the identifier of the egress node, the bit mask bit position assigned to the egress node, and an identifier of an egress interface or neighbor node via which the egress node is reachable from the node.

8. The node of claim 7, wherein the processor is further configured to:
determine a number of equal cost multi-path (ECMP) paths identified in a single set of bit masks.

9. The node of claim 8, wherein the processor is further configured for:
generating the plurality of sets of bit masks by converting the single set of bit masks into the plurality of sets of bit masks.

10. The node of claim 8:
wherein modifying the bit string of the packet or the first copy of the packet comprises logically bitwise ANDing the bit string of the packet or the first copy of the packet with the first bit mask;
wherein modifying the bit string of the packet or a second copy of the packet comprises logically bitwise ANDing the bit string of the packet or a second copy of the packet with the second bit mask.

11. The node of claim 7, wherein the flow value was generated by creating a hash of a multicast address.

12. The node of claim 7, wherein the processor is further configured to:
generate one or more of the bit masks of the first set using the bit routing table.

13. A system comprising:
a node comprising:
storage means for storing a plurality of sets of masks, wherein each set of the plurality can be used to forward a packet through a respective neighbor node towards one of a plurality of egress nodes, wherein each of the sets comprises M bit masks, wherein M is an integer greater than one, wherein each of the bit masks in each of the sets comprises N bits, wherein N is an integer greater than one, and wherein M and N are different;
network interface means for receiving a packet, wherein the packet comprises a bit string of N bits and a flow value, wherein each bit position of the bit string corresponds to a respective egress node; and
processing means for:
selecting a first set of bit masks from the plurality of sets of bit masks, wherein the selecting the first set of bit masks is based on the flow value;
selecting a first bit mask from the first set;
modifying the packet or a first copy of the packet to create a first modified packet, wherein modifying the packet or the first copy of the packet comprises modifying the bit string of the packet or the first copy of the packet based on the first bit mask;
selecting a second bit mask from the first set;
modifying the packet or a second copy of the packet to create a second modified packet, wherein modifying the packet or the second copy of the packet comprises modifying the bit string of the packet or the second copy of the packet based on the second bit mask;
forwarding the first modified packet to a first neighbor node;
forwarding the second modified packet to a second neighbor node;
receiving an advertisement sent by an egress node of the network, wherein the advertisement comprises an identifier of the egress node and a bit mask bit position assigned to the egress node; and
generating or updating a bit routing table at the node, wherein the generating or updating comprises using information from the advertisement to create an entry of the bit routing table, the entry comprising the identifier of the egress node, the bit mask bit position assigned to the egress node, and an identifier of an egress interface or neighbor node via which the egress node is reachable from the node.

14. The system of claim 13, wherein the processing means is further configured to:
determine a number of equal cost multi-path (ECMP) paths identified in a single set of bit masks.

15. The system of claim 14, wherein the processing means is further configured for:
generating the plurality of sets of bit masks by converting the single set of bit masks into the plurality of sets of bit masks.

16. The system of claim 13, wherein the flow value was created based on a hash of a multicast address.

17. A method comprising:
a node determining first and second shortest paths of equal length between the node and a first egress node of a network, wherein the first egress node is one of a plurality of egress nodes in the network, wherein the network comprises the node;
the node receiving a first packet, wherein the first packet comprises a first bit string of N bits and a first flow value, wherein bit positions of the first bit string correspond to the plurality of egress nodes, respectively;
the node selecting a first set of bit masks from a plurality of sets of bit masks that are concurrently stored in memory of the node, wherein each set of the plurality can be used to forward a packet through a respective neighbor node towards the first egress node, wherein each of the sets comprises M bit masks, wherein M is an integer greater than one, wherein each of the bit masks in each of the sets comprises N bits, wherein the selecting is based on the first flow value;
selecting a first bit mask from the first set;
modifying the first packet or a copy of the first packet to create a modified first packet, wherein modifying the first packet or the copy of the first packet comprises modifying the first bit string of the first packet or the copy of the first packet based on the first bit mask;
forwarding the modified first packet towards the first egress node via the first shortest path that comprises a first neighbor node;
the node receiving a second packet, wherein the second packet comprises a second bit string of N bits and a second flow value, wherein bit positions of the second bit string correspond to the plurality of egress nodes, respectively;
the node selecting a second set of bit masks from the plurality of sets of bit masks, based on the second flow value;
selecting a second bit mask from the second set;
modifying the second packet or a copy of the second packet to create a modified second packet, wherein modifying the second packet or the copy of the second packet comprises modifying the second bit string of the second packet or the copy of the second packet based on the second bit mask;
forwarding the modified second packet towards the first egress node via the second shortest path that comprises a second neighbor node;
receiving, at the node, an advertisement sent by an egress node of the network, wherein the advertisement comprises an identifier of the egress node and a bit mask bit position assigned to the egress node; and
generating or updating a bit routing table at the node, wherein the generating or updating comprises using information from the advertisement to create an entry of the bit routing table, the entry comprising the identifier of the egress node, the bit mask bit position assigned to the egress node, and an identifier of an egress interface or neighbor node via which the egress node is reachable from the node.

18. The method of claim 17, further comprising:
determining a number of shortest paths of equal length identified in a single set of bit masks.

19. The method of claim 18, further comprising:
generating the plurality of sets of bit masks by converting the single set of bit masks into the plurality of sets of bit masks.

20. The method of claim 17, wherein the first flow value was generated as a hash of a multicast address of the first packet.

\* \* \* \* \*